United States Patent
Takahashi et al.

(10) Patent No.: US 9,906,668 B2
(45) Date of Patent: Feb. 27, 2018

(54) IMAGE FORMING APPARATUS, FRONT-BACK MAGNIFICATION CORRECTION METHOD, AND COMPUTER PROGRAM PRODUCT

(71) Applicants: Nozomu Takahashi, Ibaraki (JP);
Tatsuya Ishii, Kanagawa (JP)

(72) Inventors: Nozomu Takahashi, Ibaraki (JP);
Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/972,878

(22) Filed: Dec. 17, 2015

(65) Prior Publication Data
US 2016/0182753 A1    Jun. 23, 2016

(30) Foreign Application Priority Data

Dec. 17, 2014 (JP) ................................. 2014-255631
Dec. 8, 2015 (JP) ................................. 2015-239241

(51) Int. Cl.
*G06K 15/00* (2006.01)
*H04N 1/00* (2006.01)

(52) U.S. Cl.
CPC ....... *H04N 1/00745* (2013.01); *H04N 1/0032* (2013.01); *H04N 1/0057* (2013.01);
(Continued)

(58) Field of Classification Search
None
See application file for complete search history.

(56) References Cited

U.S. PATENT DOCUMENTS 8,838,010 B2    9/2014  Nakura et al.
9,132,977 B2    9/2015  Ueda et al.
(Continued)

FOREIGN PATENT DOCUMENTS

JP    2013-053004    3/2013
JP    2013-060300    4/2013
JP    2014-077977    5/2014

OTHER PUBLICATIONS

U.S. Appl. No. 14/749,776, filed Jun. 25, 2015.
U.S. Appl. No. 14/887,937, filed Oct. 20, 2015.

*Primary Examiner* — Helen Q Zong
(74) *Attorney, Agent, or Firm* — Oblon, McClelland, Maier & Neustadt, L.L.P.

(57) ABSTRACT

An image forming apparatus includes: an edge detection unit that detects one edge, in a conveyance direction, of a conveyed sheet; a passing detection unit that detects passing of the one edge; a judging unit that judges whether the edge detection unit or the passing detection unit has detected the one edge, within a predetermined monitoring time after the edge detection unit or the passing detection unit detected the one edge; a notifying unit that gives a notification indicating that front-back magnification correction is difficult to perform on the sheet when the judging unit has judged that the one edge is not detected within the monitoring time; an acquiring unit that acquires a desirable front-back magnification correction value input via an input unit according to the notification; and a correction unit that performs a front-back magnification correction process on the sheet, using the acquired front-back magnification correction value.

18 Claims, 14 Drawing Sheets

(52) U.S. Cl.
CPC ..... *H04N 1/00713* (2013.01); *H04N 1/00734* (2013.01); *H04N 2201/0094* (2013.01)

(56) References Cited

U.S. PATENT DOCUMENTS

| | | | |
|---|---|---|---|
| 9,152,118 B2 | 10/2015 | Nakura et al. | |
| 2004/0075708 A1* | 4/2004 | Arakawa | B41J 29/393 347/19 |
| 2012/0140262 A1* | 6/2012 | Uwatoko | G06F 11/076 358/1.14 |
| 2013/0049287 A1 | 2/2013 | Ueda et al. | |
| 2013/0049296 A1* | 2/2013 | Takai | B65H 7/14 271/227 |
| 2013/0070267 A1* | 3/2013 | Kosasa | B41J 2/325 358/1.9 |
| 2013/0140757 A1* | 6/2013 | Phinney | G03G 15/607 271/10.01 |
| 2014/0037299 A1 | 2/2014 | Nakura et al. | |
| 2014/0218772 A1* | 8/2014 | Koshimizu | H04N 1/00013 358/461 |
| 2015/0249764 A1* | 9/2015 | Nakatani | G03G 15/0131 358/1.5 |
| 2016/0119494 A1* | 4/2016 | Mori | H04N 1/00745 358/1.12 |
| 2016/0122145 A1* | 5/2016 | Yoshii | B65H 5/068 271/265.01 |

* cited by examiner

IMAGE FORMING APPARATUS, FRONT-BACK MAGNIFICATION CORRECTION METHOD, AND COMPUTER PROGRAM PRODUCT

CROSS-REFERENCE TO RELATED APPLICATIONS

The present application claims priority to and incorporates by reference the entire contents of Japanese Patent Application No. 2014-255631 filed in Japan on Dec. 17, 2014 and Japanese Patent Application No. 2015-239241 filed in Japan on Dec. 8, 2015.

BACKGROUND OF THE INVENTION

1. Field of the Invention

The present invention relates to an image forming apparatus, a front-back magnification correction method, and a computer program product.

2. Description of the Related Art

In today's commercial printing industry, a transition is taking place from the conventional offset printing to POD using electrophotographic printing devices and the like. The POD is an abbreviation of "Print on Demand". With this, small-lot and various kinds of variable data can be printed with ease.

When the POD is used, a front-back misregistration increases as compared with that when the offset printing is used. However, with the transition from the offset printing to the POD, an accurate front-back registration equivalent to that of the offset printing is in demand.

The known factors of the front-back misregistration are a registration error in the vertical and horizontal directions, and a skew error of an image to be printed on a sheet. When a thermal fixing device is provided in an electrophotographic printing device, an image magnification error caused by the expansion and contraction of a sheet becomes another factor of the front-back misregistration, in addition to the above-described factors.

Conventionally, there is a known technique that reduces the front-back magnification errors by calculating the expansion and contraction amount of a sheet in advance, determining the front-back image magnification, and correcting the image size. To automatically correct the front-back magnification errors, the size of the sheet needs to be measured automatically. As a technique that automatically measures the size of a sheet, there is a known technique that measures the sheet length from the time required for the leading edge of a sheet being conveyed to pass in front of a sensor, until the trailing edge of the sheet to pass in front of the sensor. There is also a known technique that measures the sheet length by counting the pulses from a rotary encoder mounted on the shaft of a sheet conveyance roller.

Japanese Patent Application Laid-open No. 2013-053004 discloses a sheet conveying device that can accurately calculate the conveying distance of a sheet with a simple configuration. With this sheet conveying device, an image is formed so as to compensate the deformation of a sheet caused by the fixing device, by correcting the image magnification according to the measured sheet size, and by changing the writing position. Hence, even if the sheet is deformed, it is possible to print an image with highly accurate front-back registration.

However, the sheet, to which the front-back magnification correction can be applied, is limited to a sheet with detectable edges, to measure the sheet length. However, for example, optical sensors have difficulties in detecting the edges of a transparent overhead projector (OHP) sheet and a black paper. Thus, when a sheet, the edges of which are difficult to detect, such as a transparent OHP sheet or a black paper is used in the image forming apparatus that detects the edges of a sheet by using an optical sensor, it is difficult to accurately measure the sheet length. Hence, an optimum front-back magnification correction value cannot be calculated, and good printing results cannot be obtained.

In this manner, in the conventional image forming apparatus, the type of the sheet used for printing is set and input by a user in advance. When the user sets a sheet, the edges of which are difficult to detect, such as a transparent OHP sheet or a black paper, the image forming apparatus performs printing without performing the front-back magnification correction.

In other words, when the sheet, the edges of which are difficult to detect, such as a transparent OHP sheet or a black paper is used, the conventional image forming apparatus performs printing at the cost of front-back registration accuracy. The type of sheets to be used for printing varies by the user. Thus, it is preferable that an accurate front-back magnification correction can be applied to various types of sheets. It is also preferable to obtain good printing results.

In view of the above, there is a need to provide an image forming apparatus, a front-back magnification correction method, and a computer program product that enable more accurate front-back magnification correction on various types of sheets, and that can obtain good printing results.

SUMMARY OF THE INVENTION

It is an object of the present invention to at least partially solve the problems in the conventional technology.

An image forming apparatus includes: an edge detection unit that detects one edge, in a conveyance direction, of a sheet conveyed by a conveyance mechanism; a passing detection unit that detects passing of the one edge of the conveyed sheet; a judging unit that judges whether the edge detection unit or the passing detection unit has detected the one edge, within a predetermined monitoring time after the edge detection unit or the passing detection unit detected the one edge; a notifying unit that gives a notification indicating that front-back magnification correction is difficult to perform on the sheet when the judging unit has judged that the one edge is not detected within the monitoring time; an acquiring unit that acquires a desirable front-back magnification correction value input via an input unit according to the notification by the notifying unit; and a correction unit that performs a front-back magnification correction process on the sheet, using the acquired front-back magnification correction value.

A front-back magnification correction method includes: by an edge detection unit, detecting one edge, in a conveyance direction, of a sheet conveyed by a conveyance mechanism; by a passing detection unit, detecting passing of the edge of the conveyed sheet; by a judging unit, judging whether the edge detection unit or the passing detection unit has detected the one edge, within a predetermined monitoring time after the edge detection unit or the passing detection unit detected the one edge; by a notifying unit, giving a notification indicating that front-back magnification correction is difficult to perform on the sheet when the judging unit has judged that the one edge is not detected within the monitoring time; by an acquiring unit, acquiring a desirable front-back magnification correction value input via an input unit according to the notification; and by a correction unit, performing a front-back magnification correction process on the sheet, using the front-back magnification correction value input via the input unit.

A computer program product includes a non-transitory computer-readable medium containing an information processing program. The program causes a computer to function as: an edge detection control unit that controls an edge detection unit to detect one edge, in a conveyance direction, of a sheet conveyed by a conveyance mechanism; a passing detection control unit that controls a passing detection unit to detect passing of the one edge of the conveyed sheet; a judging unit that judges whether the edge detection unit or the passing detection unit has detected the one edge, within a predetermined monitoring time after the edge detection unit or the passing detection unit detected the one edge; a notifying unit that gives a notification indicating that front-back magnification correction is difficult to perform on the sheet when the judging unit has judged that the one edge is not detected within the monitoring time; an acquiring unit that acquires a desirable front-back magnification correction value input via an input unit according to the notification by the notifying unit; and a correction unit that performs a front-back magnification correction process on the sheet, using the acquired front-back magnification correction value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
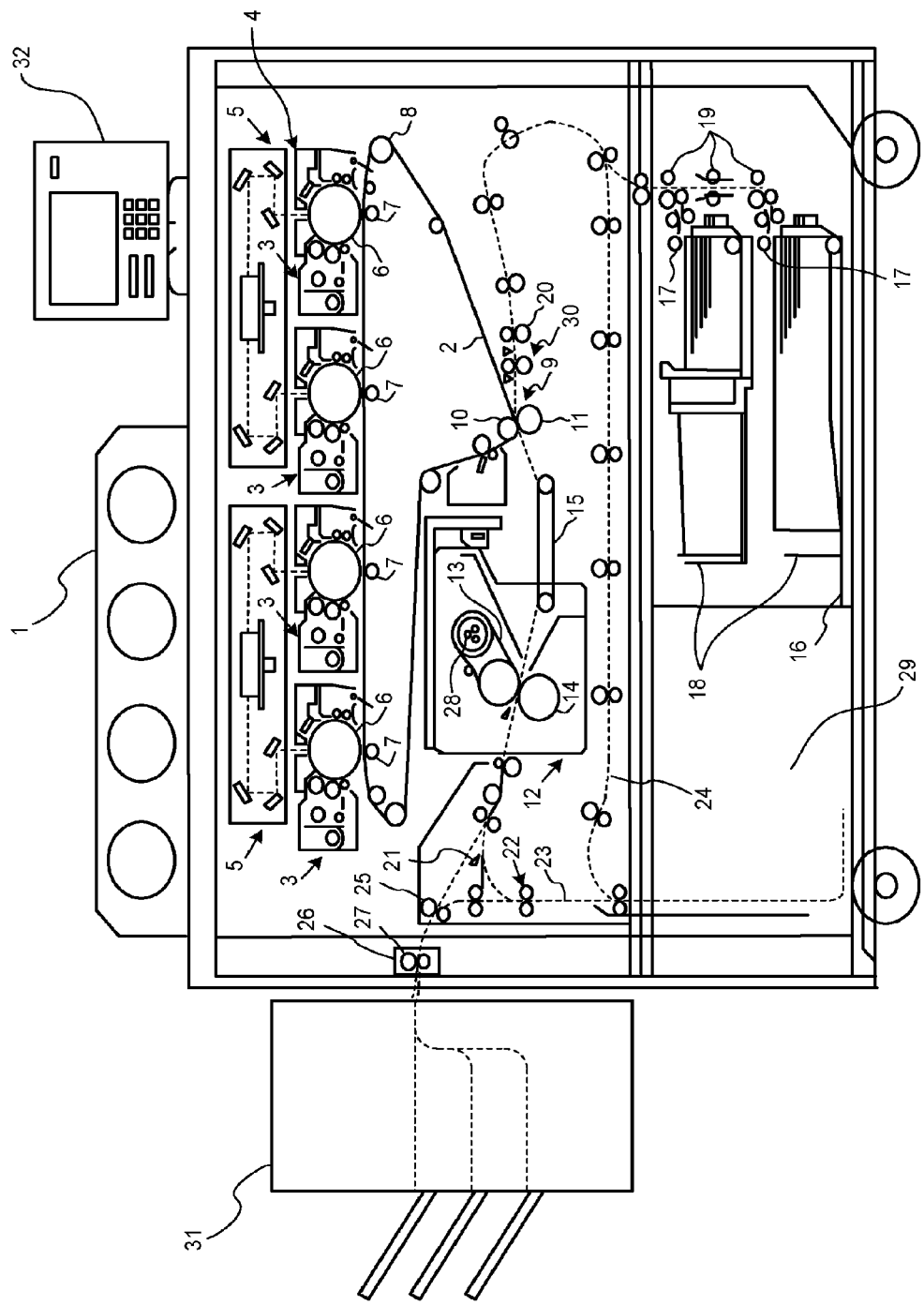
FIG. 1 is a cross-section of an image forming apparatus according to an embodiment.

An image forming apparatus according to an embodiment to which the present invention is applied will now be described. FIG. 1 is a cross-section of an image forming apparatus 1 according to the present embodiment. The image forming apparatus 1 used as an example is provided with an intermediate transfer body 2 of an endless belt type, at around the center. The intermediate transfer body 2 is stretched around and rotated by a plurality of support rollers, and rotates and conveys a sheet in a clockwise direction in FIG. 1. A plurality of image forming units 3 are arranged side by side along the conveyance direction above the intermediate transfer body 2, thereby forming a tandem image forming unit 4.

An exposure device 5 is provided above the tandem image forming unit 4. Each of the image forming units 3 of the tandem image forming unit 4 includes a photoconductor 6, which is an image bearer that bears a toner image of each color. A primary transfer roller 7, which is a constituent element of a primary transfer unit, is provided at a primary transfer position, where a toner image is transferred from the photoconductor 6 to the intermediate transfer body 2. The primary transfer roller 7 faces each photoconductor 6, so that the intermediate transfer body 2 is interposed between the primary transfer roller 7 and the photoconductor 6. A support roller 8 is a driving roller that rotationally drives the intermediate transfer body 2.

A secondary transfer unit 9 is provided at the opposite side of the tandem image forming unit 4, interposing the intermediate transfer body 2 therebetween. At the secondary transfer unit 9, a transfer electric field is applied to a secondary transfer opposing roller 10, when a secondary transfer roller 11 is pressed against the secondary transfer opposing roller 10. Thus, an image on the intermediate transfer body 2 is transferred onto a recording member (sheet). The secondary transfer unit 9 changes the transfer current of the secondary transfer roller 11, which is a parameter for the transfer conditions, according to the sheet. A sheet length measuring unit 30 is provided at the upstream side of the secondary transfer unit 9. A fixing device 12 that melts and bonds the transfer image (toner image) on the sheet by heat is provided at the downstream side of the secondary transfer unit 9.

The sheet length measuring unit 30 measures the length of a sheet before and after it has passed the fixing device 12, at the time of both-side printing, and performs magnification correction on the back surface of the sheet, using the expansion and contraction ratio of the sheet. The fixing device 12 includes a halogen lamp 28, which is a heat source, and is formed when a pressure roller 14 is pressed against a fixing belt 13, which is an endless belt. The fixing device 12 changes the temperatures of the fixing belt 13 and the pressure roller 14, the nip width between the fixing belt 13 and the pressure roller 14, and the speed of the pressure roller 14, which are parameters of the fixing conditions, according to the sheet. When the image is transferred onto the sheet, the sheet is conveyed to the fixing device 12 via a conveyance belt 15.

When the image data is transmitted to the image forming apparatus 1, upon receiving an image formation start signal, the driving roller rotationally drives the support roller 8. Then, a plurality of other support rollers are rotationally driven, thereby rotating the intermediate transfer body 2. At the same time, a monochrome image is formed on each of the photoconductors 6 in each of the image forming units 3. With the conveyance of the intermediate transfer body 2, each monochrome image is sequentially transferred with the primary transfer roller 7, thereby forming a composite color image on the intermediate transfer body 2.

Also, one of paper feeding rollers 17 of a paper feeding table 16 is selectively rotated, and a sheet is fed from one of paper feeding cassettes 18. The sheet is conveyed to the position where it comes into contact with a registration roller 20, by a conveyance roller 19. Next, the registration roller 20 is rotationally driven to match the timing of the composite color image on the intermediate transfer body 2, and a color image is recorded on the sheet at the secondary transfer unit 9. When the image is transferred, the sheet is conveyed from the secondary transfer unit 9 to the fixing device 12, and the transfer image is melted and bonded to the sheet by heat and pressure. The sheet to which the transfer image is melted and bonded, when both-sided printing is set, is conveyed to a sheet reversing path 23 and a both side conveyance path 24, by a bifurcating claw 21 and a flip roller 22. Similarly to the above, a composite color image is recorded on the back of the sheet.

To reverse the sheet, the sheet is conveyed to the sheet reversing path 23 by the bifurcating claw 21, and the sheet is conveyed to the side of a paper ejection roller 25, by the flip roller 22. Thus, the front surface and back surface of the sheet is reversed. When single side printing is set or when there is no need to reverse the sheet, the sheet is conveyed to the paper ejection roller 25, by the bifurcating claw 21. The sheet is then conveyed to a decurler unit 26 by the paper ejection roller 25. The decurler unit 26 straightens the curl of the sheet by a decurler amount, which is adjusted by changing pressure according to the sheet. A decurler roller 27 then ejects the sheet with the straightened curl.

A purge tray 29 is arranged at the lower side of the reverse paper ejection unit. In the image forming apparatus 1, when both sides of the sheets are continuously printed, eight sheets of paper are conveyed including the sheet in the reversing path. A new sheet is fed from the paper feeding cassette 18, between the fourth sheet, the front side of which has been printed, and the fifth sheet, the front side of which has been printed. A post-processing unit 31 sorts the sheets ejected from the image forming apparatus 1. The post-processing unit 31 also separates the printed sheets into each tray, shifts the sheets, and ejects them to the tray. An operating unit 32 is used to input print information by a user, to display the printing status, to notify a user of the contents of an error upon the occurrence of the error, and the like. A print control unit controls the operating unit 32. The print control unit stores therein print information input by a user.

Figure 2:
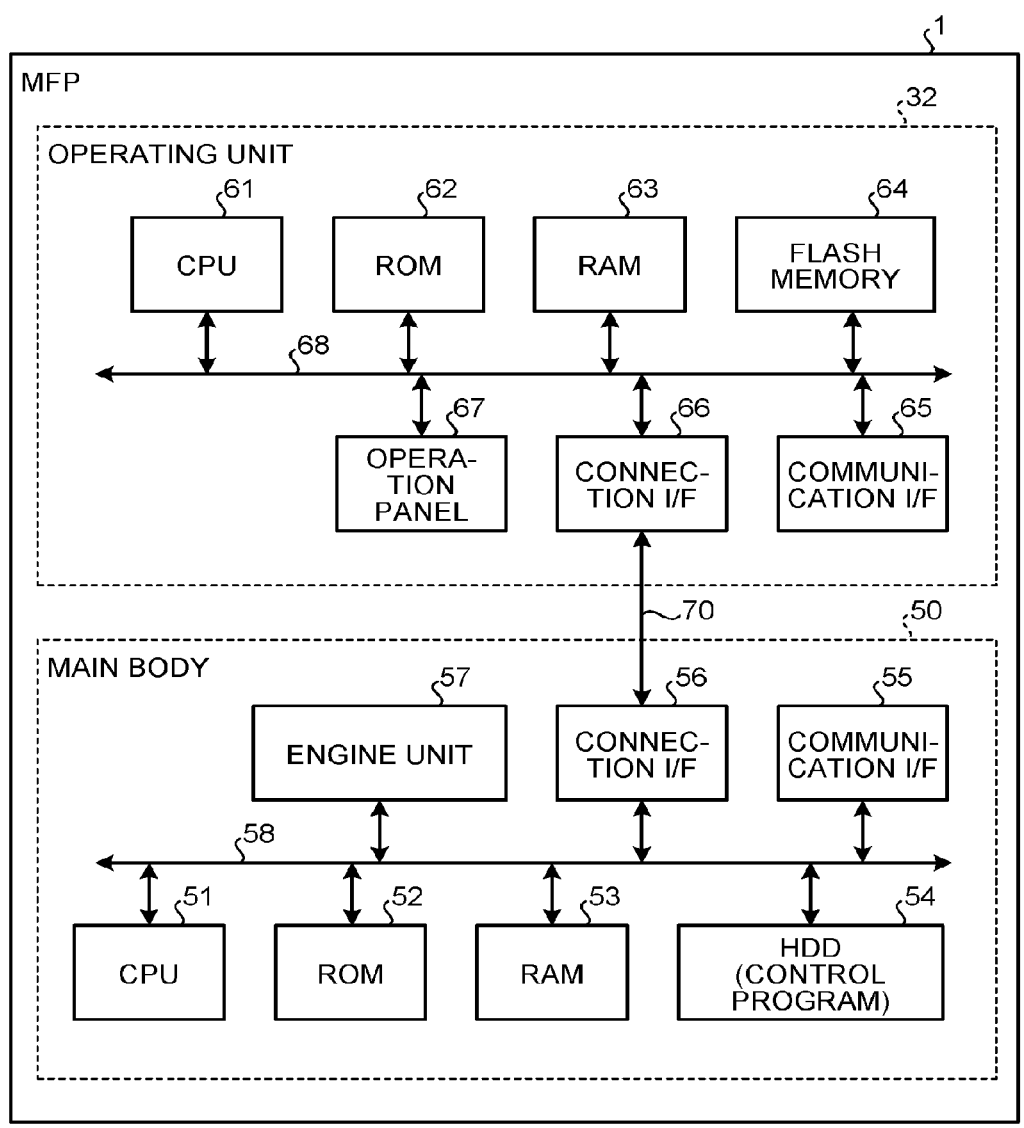
FIG. 2 is a hardware configuration diagram of the image forming apparatus according to the present embodiment.

FIG. 2 is a hardware configuration diagram of the image forming apparatus 1. The image forming apparatus 1 includes a main body 50 and the operating unit 32. The main body 50 is provided with various functions such as a copying function, a scanner function, a facsimile function, and a printer function. The operating unit 32 receives an input according to an operation by a user. The main body 50 and the operating unit 32 are communicably connected to each other via an exclusive communication path 70. For example, the Universal Serial Bus (USB) standard may be used for the communication path 70. However, any standard may be used, regardless of wired or wireless communication.

The operating unit 32 may be an information processing terminal, which is an electronic device capable of performing information processing completed by itself, such as a smartphone or a tablet terminal. In this case, for example, a screen for operating various applications operated on the main body 50 of the image forming apparatus 1 is displayed on the information processing terminal used as the operating unit 32.

More specifically, the information processing terminal used as the operating unit 32 is detachably connected to the image forming apparatus 1, instead of an operation panel fixedly installed in the image forming apparatus 1 as an exclusive operating unit for the image forming apparatus 1. The information processing terminal used as the operating unit 32 is integrally installed in the image forming apparatus 1 at the position where the operation panel of the image forming apparatus 1 is disposed, while it is removable (separable), for example. Hence, the information processing terminal used as the operating unit 32 and the image forming apparatus 1 may be recognized as a single device. When the information processing terminal, which is the operating unit 32, is removed from the image forming apparatus 1, the information processing terminal functions as the operating unit of the image forming apparatus 1, by performing wireless communication such as Bluetooth (registered trademark) or infrared communication with the image forming apparatus 1.

The main body 50 performs an operation according to the input received by the operating unit 32. The main body 50 can also communicate with an external device such as a client PC (personal computer), and may operate according to an instruction from the external device.

A hardware configuration of the main body 50 will now be described. As illustrated in FIG. 2, the main body 50 includes a central processing unit (CPU) 51, read-only memory (ROM) 52, random-access memory (RAM) 53, a hard disk drive (HDD) 54, a communication interface (I/F)

55, a connection I/F 56, and an engine unit 57. The units from the CPU 51 to the engine unit 57 are connected to each other via a system bus 58.

The CPU 51 integrally controls the operation of the main body 50. The CPU 51 executes application programs stored in the ROM 52, the HDD 54, or the like, using the RAM 53 as a work area (working space). Thus, the CPU 51 controls the overall operation of the main body 50, and implements various functions such as the copying function, the scanner function, the facsimile function, and the printer function.

The communication I/F 55 is an interface that communicates with an external device such as a client personal computer (PC). The connection I/F 56 is an interface that communicates with the operating unit 32 via the communication path 70. In FIG. 2, the communication path 70 is illustrated as being wired. However, as described above, the operating unit 32 is attachably and removably provided to the main body 50 of the image forming apparatus 1. Thus, it is to be understood that the communication path 70 functions as a wired communication path when the operating unit 32 is mounted on the image forming apparatus 1, and functions as a wireless communication path when the operating unit 32 is removed from the image forming apparatus 1.

The engine unit 57 is hardware that performs general information processing and processing other than communication, to implement the copying function, the scanner function, the facsimile function, the printer function, and the like. The engine unit 57, for example, includes a scanner (image reading unit) that scans and reads an image on a document, a plotter (image forming unit) that prints the image on a sheet material such as a sheet of paper, and a facsimile unit that performs facsimile communication. The engine unit 57 may also include specific options such as a finisher that sorts printed sheet materials and an automatic document feeder (ADF) that automatically feeds documents.

A hardware configuration of the operating unit 32 will now be described. As illustrated in FIG. 2, the operating unit 32 includes a CPU 61, a ROM 62, a RAM 63, a flash memory 64, a communication I/F 65, a connection I/F 66, and an operation panel 67. The units from the CPU 61 to the operation panel 67 are connected to each other via a system bus 68.

The CPU 61 integrally controls the operation of the operating unit 32. The CPU 61 executes computer programs stored in the ROM 62, the flash memory 64, or the like, using the RAM 63 as a work area (working space). Thus, the CPU 61 controls the overall operation of the operating unit 32, and implements various functions, which will be described below, such as to display information (image) according to the input received from a user.

The communication I/F 65 is an interface that communicates with a predetermined server device on a network. The connection I/F 66 is an interface that communicates with the main body 50 via the communication path 70.

The operation panel 67 receives various inputs according to an operation by a user, and for example, displays various types of information, such as information corresponding to the received input, information indicating the operation status of the image forming apparatus 1, the setting state, and the like. In this example, the operation panel 67 is composed of a liquid crystal display (LCD) having a touch panel function. However, it is not limited thereto. For example, the operation panel 67 may be composed of an organic electroluminescence (EL) display device having a touch panel function. In addition to this, or alternatively, an operating unit such as a hardware key or a display unit such as a light-emitting unit may also be included.

Figure 3:
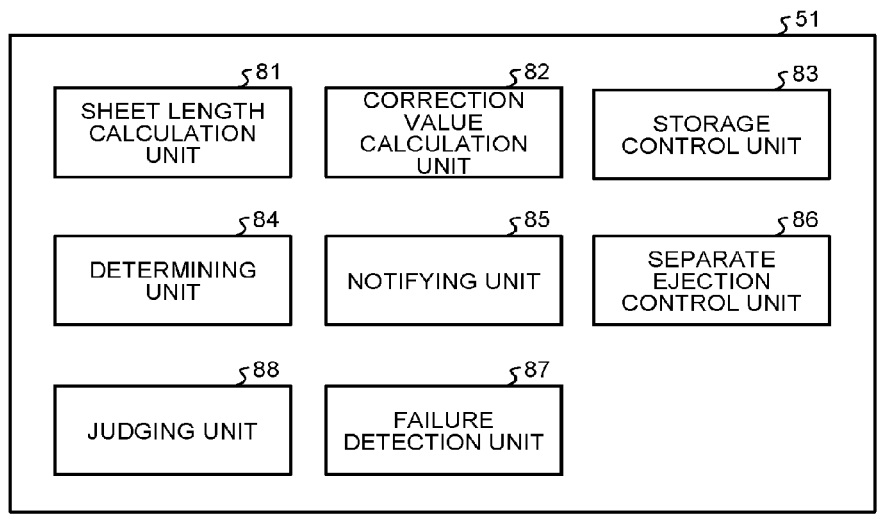
FIG. 3 is a functional block diagram illustrating functions implemented when the CPU of the image forming apparatus according to the present embodiment operates based on a control program.

The image forming apparatus 1 according to the present embodiment automatically identifies a special sheet, the edges of which are difficult to detect, such as an OHP sheet or a black paper, which will be described below, by the optical sensor. The image forming apparatus 1 then selects an appropriate correction value for the front-back magnification correction, thereby obtaining good printing results. A control program (front-back magnification correction program) that enables such a control is stored in the HDD 54 illustrated in FIG. 1. The CPU 51 in the main body 50 of the image forming apparatus 1 reads out the control program from the HDD 54 and performs the program, at the time of printing and the like. FIG. 3 is a functional block diagram illustrating various functions implemented when the CPU 51 operates based on the control program.

As illustrated in FIG. 3, the CPU 51 functions as a sheet length calculation unit 81, a correction value calculation unit 82, a storage control unit 83, a determining unit 84, a notifying unit 85, a separate ejection control unit 86, a failure detection unit 87, and a judging unit 88, by operating based on the front-back magnification correction program.

The sheet length calculation unit 81 calculates a sheet length from the conveyance amount of the sheet. The correction value calculation unit 82 calculates a front-back magnification correction value from the calculated sheet length. The storage control unit 83 stores the calculated correction value in a storage unit such as the RAM 53 or the HDD 54. The determining unit 84 determines the appropriateness of the sheet length calculated by the sheet length calculation unit 81, by using the detection results of the passing of the leading edge and the trailing edge of a sheet. The judging unit 88 judges whether the passing of the leading edge and the trailing edge of the sheet is detected. When the judging unit 88 cannot detect the passing of the leading edge and the trailing edge of the sheet, the notifying unit 85 notifies a user that the sheet length of the sheet cannot be calculated, via the operation panel 67. The notifying unit 85 also urges a user to input a desirable front-back magnification correction value relative to a sheet 39, to which the front-back magnification correction is difficult to apply, via the operation panel 67. The separate ejection control unit 86 separately ejects the printing materials, the passing of the leading edge and the trailing edge of which cannot be detected, as well as the sheet length of which cannot be measured. The failure detection unit 87 determines a failure of the detection unit that detects the passing of the leading edge of the sheet, and a failure of the detection unit that detects the passing of the trailing edge of the sheet, from the combination of the detection outputs of the passing of the leading edge and the trailing edge of the sheet.

In this example, the units from the sheet length calculation unit 81 to the judging unit 88 are implemented by software. However, all or a part thereof may be implemented by hardware.

The control program may be recorded in a computer-readable recording medium such as a compact disc-read only memory (CD-ROM), a flexible disk (FD), and the like, in an installable or executable file format. The control program may also be recorded in a computer-readable recording medium such as a compact disc-recordable (CD-R), a DVD, a Blu-ray disc (registered trademark), and a semiconductor memory. The DVD is an abbreviation for "digital versatile disc". The control programs may also be provided via a network such as the Internet. The image forming apparatus 1 may also download a control program via a network, and execute the control program by installing it in the operating unit 32 (or the main body 50). The control program may also be incorporated into the ROM and the like in the device in advance.

Figure 4:
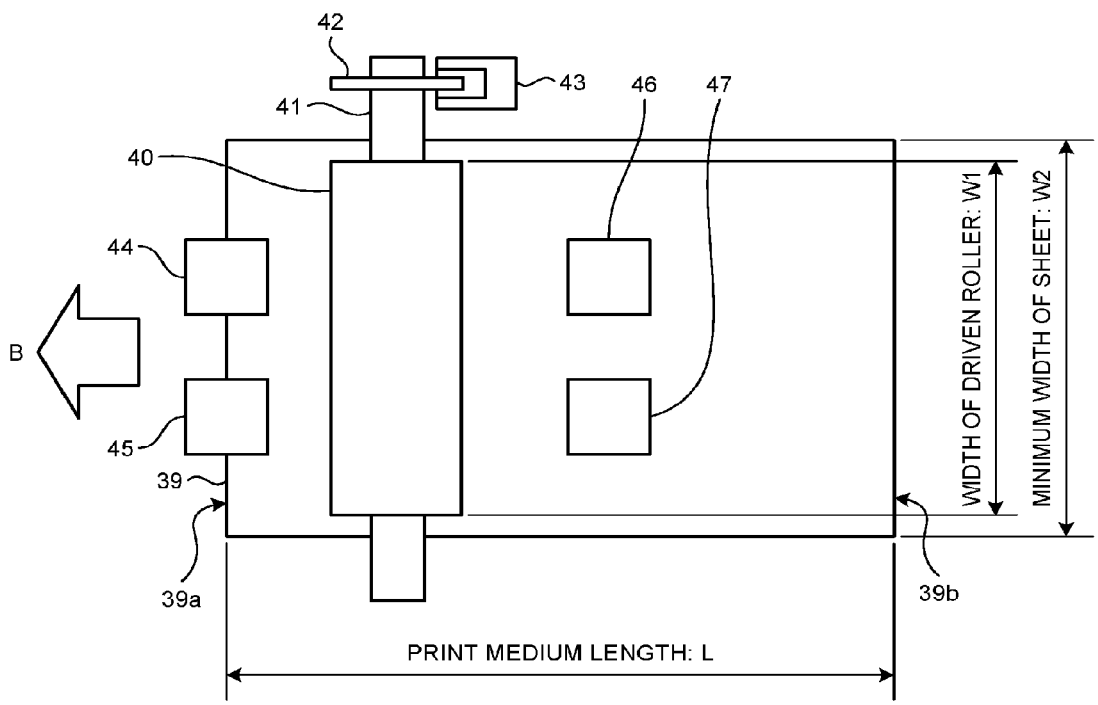
FIG. 4 is a schematic illustrating a sheet of paper conveyed by being nipped between a driven roller and a driving roller of the image forming apparatus according to the present embodiment, when viewed from the side of the driven roller.
Figure 5:
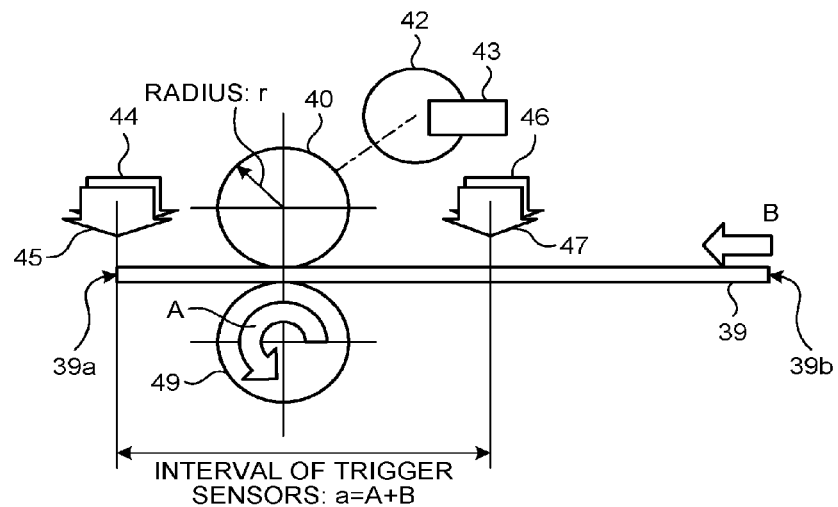
FIG. 5 is a schematic illustrating a sheet of paper conveyed by being nipped between the driven roller and the driving roller of the image forming apparatus according to the present embodiment, when viewed in the direction along a rotating shaft of each of the rollers.

With reference to FIG. 4 and FIG. 5, a measuring operation of a sheet length in the image forming apparatus 1 according to the present embodiment will now be described. A driving roller 49 and a driven roller 40 are examples of a conveyance mechanism. The driving roller 49 and the driven roller 40 convey the sheet 39, while nipping and rotating the sheet 39. A motor and a driving force transmitting unit such as a gear and a belt rotatably drives the driving roller 49. The surfaces of the driving roller 49 and the driven roller 40 are made of rubber layers to maintain the friction coefficient with the sheet 39.

The driven roller 40 is arranged so as to come into press contact with the driving roller 49, using a bias member such as a spring. When the sheet is conveyed, the driven roller 40 is driven to rotate by the sheet 39. The width W1 of the driven roller 40 is designed so that it is smaller than the minimum width W2 of the sheet 39 supported by the image forming apparatus 1. Thus, while the sheet 39 is being conveyed, the driven roller 40 does not directly come into contact with the driving roller 49, and driven to rotate via the sheet 39. In FIG. 4 and FIG. 5, the roller below the sheet 39 is the driving roller 49, and the roller above the sheet 39 is the driven roller 40. However, the roller below the sheet 39 may be the driven roller 40, and the roller above the sheet 39 may be the driving roller 49.

The driven roller 40 is a metal roller to secure the axial deflection accuracy. An encoder disk 42 that rotates with the driven roller 40 is provided at one end of a rotation shaft 41 of the driven roller 40. An encoder sensor 43 generates the number of pulse signals according to the rotating speed of the encoder disk 42. The sheet length calculation unit 81 illustrated in FIG. 3 calculates the sheet length of the sheet 39, from the number of pulses from the encoder sensor 43.

A start trigger sensor 45 that detects the passing of a leading edge 39a of the sheet 39 is provided in the vicinity of the upstream side of the driving roller 49 and the driven roller 40. A stop trigger sensor 47 that detects the passing of a trailing edge 39b of the sheet 39 is provided in the vicinity of the downstream side of the driving roller 49 and the driven roller 40. The start trigger sensor 45 and the stop trigger sensor 47 are examples of an edge detection unit. The start trigger sensor 45 is an example of a first edge detection unit and the stop trigger sensor 47 is an example of a second edge detection unit.

As an example of the start trigger sensor 45 and the stop trigger sensor 47, a highly directional reflection-type optical sensor may be used. By using the highly accurate reflection-type optical sensor for the start trigger sensor 45 and the stop trigger sensor 47, it is possible to detect the edge of the sheet 39 with high accuracy. However, even if the highly accurate reflection-type optical sensor is used, the edge of a transparent OHP sheet, a black paper, and the like are difficult to detect.

A first sheet running sensor 44 that detects a paper jam, is arranged beside the start trigger sensor 45 such as above, in a side-by-side manner. A second sheet running sensor 46 that detects a paper jam, is arranged beside the stop trigger sensor 47 in a side-by-side manner. The first sheet running sensor 44 and the second sheet running sensor 46 are examples of a passing detection unit. The first sheet running sensor 44 is an example of a first passing detection unit and the second sheet running sensor 46 is an example of a second passing detection unit. The start trigger sensor 45 and the first sheet running sensor 44 need not be arranged side by side, as long as they are installed on the sheet conveyance path. Similarly, the stop trigger sensor 47 and the second sheet running sensor 46 need not be arranged side by side, as long as they are installed on the sheet conveyance path.

The highly accurate reflection-type optical sensor is used for the start trigger sensor 45 and the stop trigger sensor 47. However, a non-directional reflection-type optical sensor, which is a general sheet detection sensor, is used for the first sheet running sensor 44 and the second sheet running sensor 46. Because the non-directional reflection-type optical sensor is used for the first sheet running sensor 44 and the second sheet running sensor 46, the edge detection accuracy of the sheet 39 is not very high. However, regardless of the paper type of the sheet 39, the first sheet running sensor 44 and the second sheet running sensor 46 can accurately detect whether the sheet 39 has passed in front of the first sheet running sensor 44 and the second sheet running sensor 46.

In other words, even if the start trigger sensor 45 and the stop trigger sensor 47 cannot detect the edge of the sheet 39 due to the paper type of the sheet 39, the first sheet running sensor 44 and the second sheet running sensor 46 can detect whether the sheet 39 has passed in front of the first sheet running sensor 44 and the second sheet running sensor 46. As will be described below, the image forming apparatus 1 according to the present embodiment judges whether the sheet 39 currently being conveyed is a sheet from which the front-back magnification correction value can be calculated, comprehensively from each of the detection outputs from the start trigger sensor 45, the stop trigger sensor 47, the first sheet running sensor 44, and the second sheet running sensor 46.

For example, it is also possible to provide a sensor that can detect whether the sheet 39 has passed in front of the sensor, regardless of the paper type of the sheet 39, such as a contact-type sensor or an ultrasonic sensor, instead of the reflection-type optical sensor. In the examples illustrated in FIG. 4 and FIG. 5, the first sheet running sensor 44, the start trigger sensor 45, the second sheet running sensor 46, and the stop trigger sensor 47 are illustrated above the sheet 39. However, the first sheet running sensor 44, the start trigger sensor 45, the second sheet running sensor 46, and the stop trigger sensor 47 may also be provided below the sheet 39.

With reference to FIG. 4 and FIG. 5, a basic operation for measuring the sheet length in the image forming apparatus 1 according to the present embodiment will now be described. The driving roller 49 rotates in an arrow A direction in FIG. 5. When the driving roller 49 rotates in an idling mode when the sheet 39 is not conveyed, the driven roller 40, which is directly in contact with the driving roller 49, is also driven to rotate. Thus, the encoder disk 42 mounted on the rotation shaft 41 of the driven roller 40 also rotates according to the rotation of the driven roller 40. The encoder sensor 43 also generates the number of pulse signals according to the rotating speed of the driven roller 40.

The sheet 39 is then conveyed in an arrow B direction illustrated in FIG. 4 and FIG. 5. While being conveyed, the sheet 39 is nipped between the driving roller 49 and the driven roller 40, and the driven roller 40 is driven to rotate via the sheet 39. When the leading edge 39a of the conveyed sheet 39 has passed in front of the start trigger sensor 45 provided at the downstream side of the driving roller 49 and the driven roller 40, the start trigger sensor 45 generates a start pulse. The sheet length calculation unit 81 then starts counting the pulse signals generated by the encoder sensor 43, at the timing when the start pulse is detected.

When the trailing edge 39b of the sheet 39 being conveyed has passed in front of the stop trigger sensor 47 provided at the upstream side of the driving roller 49 and the driven roller 40, the stop trigger sensor 47 generates a stop pulse. The sheet length calculation unit 81 then stops counting the pulse signals generated by the encoder sensor 43, at the timing when the stop pulse is detected. The subsequent sheets are similarly conveyed, and the sheet length calculation unit 81 counts the pulse signals as described above.

Figure 6:
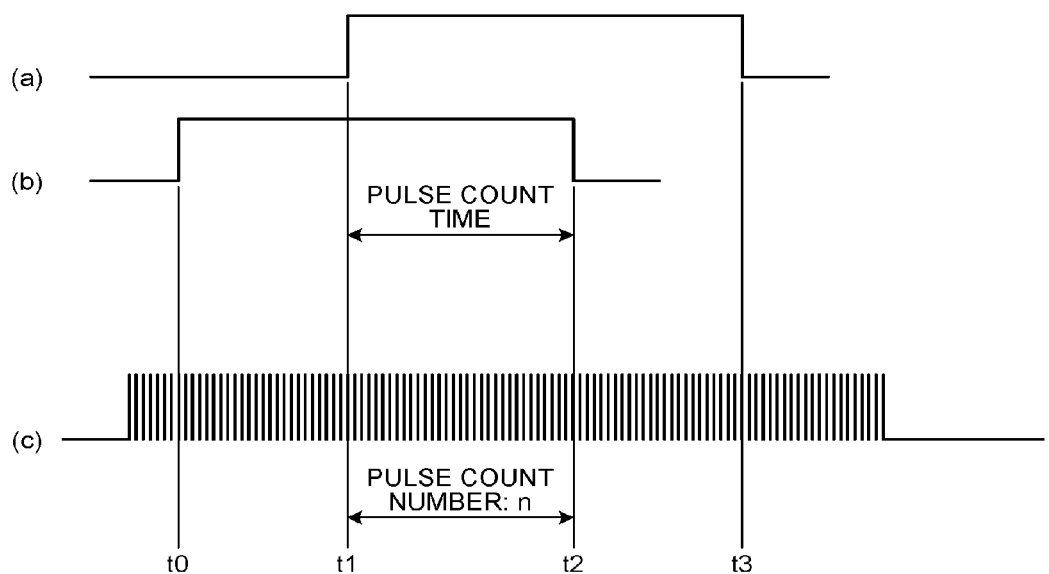
FIG. 6 is a schematic for explaining an operation for measuring a printing medium length (sheet length), by counting pulse signals from an encoder sensor, in the image forming apparatus according to the present embodiment.

With reference to FIG. 6, a method for measuring a print medium length (sheet length) by counting the pulse signals generated by the encoder sensor 43 will now be described. First, while the sheet 39 is conveyed to the position of the driving roller 49 and the driven roller 40, the leading edge 39a passes in front of the stop trigger sensor 47. At this timing, as illustrated at time t0 of the waveform designated by reference character b in FIG. 6, a high-level stop trigger pulse is generated. As illustrated by the waveform designated by reference character b in FIG. 6, the high-level stop trigger pulses are generated while the sheet 39 is conveyed by being nipped between the driving roller 49 and the driven roller 40, until time t2, when the trailing edge 39b of the sheet 39 has passed in front of the stop trigger sensor 47.

At the timing when the leading edge 39a of the sheet 39, which is conveyed by being nipped between the driving roller 49 and the driven roller 40, has passed in front of the start trigger sensor 45, as illustrated at time t1 of the waveform designated by reference character a in FIG. 6, a high-level stop trigger pulse is generated. As illustrated by the waveform designated by reference character a in FIG. 6, the high-level stop trigger pulses are generated, until time t3, when the trailing edge 39b of the sheet 39 has passed in front of the start trigger sensor 45.

The sheet length calculation unit 81 starts counting the pulse signals generated by the encoder disk 42 and the encoder sensor 43, illustrated by the waveform designated by reference character c in FIG. 6, at the timing (timing at time t1 of the waveform designated by reference character a in FIG. 6) when the start trigger sensor 45 at the downstream side detects the leading edge 39a of the sheet 39 conveyed by the driving roller 49 and the driven roller 40. The sheet length calculation unit 81 then stops counting the pulse signals, at the timing (timing at time t2 of the waveform designated by reference character b in FIG. 6) when the stop trigger sensor 47 at the upstream side detects the trailing edge 39b of the conveyed sheet 39. In other words, the counting time of the pulse signals (pulse count time) is between time t1 and time t2 in FIG. 6. The sheet length calculation unit 81 detects the number of pulse signals (pulse count number n) counted during the pulse count time.

The radius of the driven roller 40, on which the encoder sensor 43 for counting pulses is mounted, is expressed by "r (mm)", the number of pulse signals per one rotation of the driven roller 40 is expressed by "N", and the number of pulses counted during the pulse count time is expressed by "n". The distance between the start trigger sensor 45 and the stop trigger sensor 47 that determine to start and stop counting pulses is expressed by "a (mm)". The sheet length calculation unit 81 calculates the sheet length "L (mm)" by using the formula 1 below:

$$L=((n/N)\times 2\pi r)+a \qquad \text{(Formula 1)}$$

In general, the sheet conveyance speed changes depending on the outer shape accuracy of a conveyance roller (particularly, the driving roller 49), the machine accuracy such as the core deflection accuracy, the rotation accuracy of a motor, and the like, and the power transmission accuracy of a gear, belt, and the like. The sheet conveyance speed also changes depending on a slip phenomenon between the driving roller 49 and the sheet 39, a loosening phenomenon caused by the difference in the sheet conveyance power or the sheet conveyance speed between the rollers at the upstream side and the downstream side, and the like. However, although the pulse cycle and the pulse width change due to the above factors, the number of pulses does not change. Thus, the sheet length calculation unit 81 can calculate the accurate sheet length by calculating the above formula, without being influenced by the sheet conveyance speed.

The absolute length of the sheet 39 being conveyed can be calculated by the above formula. It is also possible to calculate the relative ratio such as a ratio of the pages and the ratio of the front and back. For example, the expansion and contraction ratio "R" of the sheet 39 can be calculated from the relative ratio of the sheet length before and after it is thermally fixed, using the formula 2 below. In the formula, "n1" is the pulse count number counted at the time when the sheet 39, which is not yet thermally fixed, has passed, and "n2" is the pulse count number counted at the time when the sheet 39, which is thermally fixed, has passed.

$$R=[(n2/N)\times 2\pi r)+a]/[((n1/N)\times 2\pi r)+a]\approx n2/n1 \qquad \text{(Formula 2)}$$

When the distance a between the start trigger sensor 45 and the stop trigger sensor 47 that determine the start and the end of counting pulses is sufficiently smaller than the sheet length L, the relative ratio of the sheet length is closer to the ratio of the counted number of pulses. The distance a is determined by the size of the sheet 39 supported by the image forming apparatus 1 and the measuring accuracy of the sheet length requested by the image forming apparatus 1. In the image forming apparatus 1 according to the present embodiment, for example, the distance a is equal to or less than one tenth of the maximum sheet length.

Figure 7:
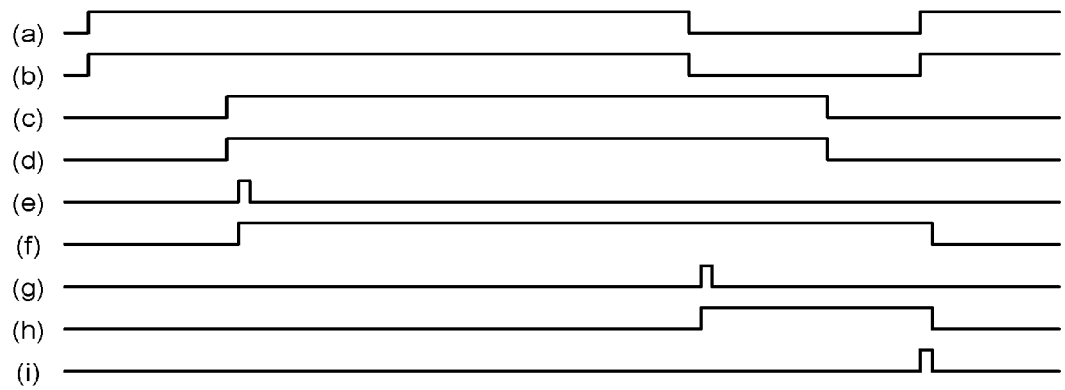
FIG. 7 is a schematic illustrating various types of signals used to judge whether front-back magnification correction can be applied to the sheet, in the image forming apparatus according to the present embodiment.

Next, as will be described below, when a user sets the sheet 39, to which the front-back magnification correction is difficult to apply, the image forming apparatus 1 according to the present embodiment automatically identifies that the front-back magnification correction cannot be applied to the sheet 39. FIG. 7 is a schematic illustrating types of signals used to judge whether front-back magnification correction can be applied to the sheet 39, in the image forming apparatus 1 according to the present embodiment.

The signal designated by reference character a in FIG. 7 is an edge detection output of the sheet 39 by the stop trigger sensor 47. The stop trigger sensor 47 outputs high-level edge detection outputs, from when the leading edge 39a of the sheet 39 being conveyed has passed, until when the trailing edge 39b has passed. The signal designated by reference character b in FIG. 7 is an edge detection output of the sheet 39 by the second sheet running sensor 46, which is arranged beside the stop trigger sensor 47 in a side-by-side manner. Similarly, the second sheet running sensor 46 also outputs high-level edge detection outputs, from when the leading edge 39a of the sheet 39 being conveyed has passed, until when the trailing edge 39b of the sheet 39 has passed.

The signal designated by reference character c in FIG. 7 is an edge detection output of the sheet 39 by the start trigger sensor 45. The start trigger sensor 45 outputs high-level edge detection outputs, from when the leading edge 39a of the sheet 39 being conveyed has passed, until when the trailing edge 39b has passed. The signal designated by reference character d in FIG. 7 is an edge detection output of the sheet 39 by the first sheet running sensor 44 arranged beside the start trigger sensor 45 in a side-by-side manner. The first sheet running sensor 44 outputs high-level edge detection outputs, from when the leading edge 39a of the sheet 39 being conveyed has passed, until when the trailing edge 39b has passed.

The stop trigger sensor 47 and the second sheet running sensor 46 are provided at the prior stage (upstream side as described above) of the driving roller 49 and the driven roller 40. The start trigger sensor 45 and the first sheet running sensor 44 are provided at the subsequent stage (downstream side as described above) of the driving roller 49 and the driven roller 40. Thus, the sheet 39 being conveyed first passes in front of the stop trigger sensor 47 and the second sheet running sensor 46, and then passes in front of the start trigger sensor 45 and the first sheet running sensor 44.

Each of the detection outputs of the stop trigger sensor 47, the second sheet running sensor 46, the start trigger sensor 45, and the first sheet running sensor 44 is a high level, by the time corresponding to the sheet length of the sheet 39. Hence, the time during which each of the detection outputs of the stop trigger sensor 47, the second sheet running sensor 46, the start trigger sensor 45, and the first sheet running sensor 44 becomes a high level, is the same.

However, the "stop trigger sensor 47 and second sheet running sensor 46" and the "start trigger sensor 45 and first sheet running sensor 44" are placed at different locations. Thus, there is a timing difference in when the sheet 39 being conveyed has passed. Consequently, as is evident by comparing the waveforms designated by reference characters from a to d in FIG. 7, there is a difference between the timing when the "stop trigger sensor 47 and second sheet running sensor 46" becomes a high level, and the timing when the "start trigger sensor 45 and first sheet running sensor 44" becomes a high level. This is due to the difference in installation locations and the difference according to the conveyance speed of the sheet 39.

The signal designated by reference character e in FIG. 7 is a first interruption signal generated when the start trigger sensor 45 cannot detect the leading edge 39a of the sheet 39, within a predetermined time after the first sheet running sensor 44 has detected the leading edge 39a of the sheet 39. The signal designated by reference character f in FIG. 7 is a first monitor signal that becomes a high level, from when the first interruption signal is generated, until when the stop trigger sensor 47 or the second sheet running sensor 46 detects the leading edge 39a of the sheet 39 to be conveyed next (until a clear signal is generated, which will be described below). The first monitor signal indicates a monitoring section relative to the sheet 39, the leading edge 39a of which cannot be detected.

The signal designated by reference character g in FIG. 7 is a second interruption signal generated when the stop trigger sensor 47 cannot detect the trailing edge 39b of the sheet 39, within a predetermined time after the second sheet running sensor 46 has detected the trailing edge 39b of the sheet 39. The signal designated by reference character h in FIG. 7 is a second monitor signal that becomes a high level, from when the second interruption signal is generated, until when the stop trigger sensor 47 or the second sheet running sensor 46 detects the leading edge 39a of the sheet 39 to be conveyed next (until a clear signal is generated, which will be described below). The second monitor signal indicates a monitoring section relative to the sheet 39, the trailing edge 39b of which cannot be detected.

The signal designated by reference character i in FIG. 7 is a clear signal generated at the timing when the stop trigger sensor 47 or the second sheet running sensor 46 detects the leading edge 39a of the sheet 39 to be conveyed next. At the timing when this clear signal is generated, the first monitor signal and the second monitor signal make a transition from a high level to a low level. The image forming apparatus 1 according to the present embodiment judges whether front-back magnification correction can be applied to the sheet 39, by using the various signals such as these. A detailed description will now be made.

Figure 8:
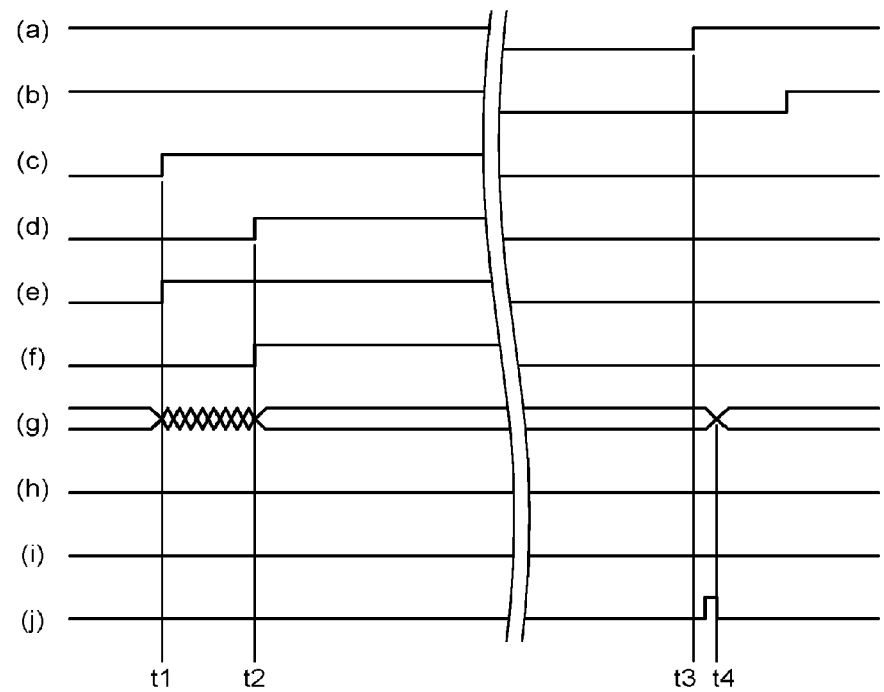
FIG. 8 is a schematic illustrating signal waveforms of signals corresponding to the detection of the leading edge of a sheet, when the sheet to which the front-back magnification correction can be applied, is conveyed in the image forming apparatus according to the present embodiment.

FIG. 8 illustrates signal waveforms of signals, when the sheet 39, to which the front-back magnification correction can be applied, is conveyed. In this case, as illustrated by the signal designated by reference character c in FIG. 8, a high-level edge detection output is generated, at the timing of time t1, when the start trigger sensor 45 detects the leading edge 39a of the sheet 39 being conveyed. Similarly, as illustrated by the signal designated by reference character d in FIG. 8, a high-level edge detection output is generated, at the timing of time t2, when the first sheet running sensor 44 detects the leading edge 39a of the sheet 39 being conveyed.

The start trigger sensor 45 and the first sheet running sensor 44 are arranged side by side in the direction perpendicular to the conveyance direction on the two-dimensional plane. Thus, it is preferable that a high-level edge detection output is output at the same time when the sheet 39 has passed in front of the start trigger sensor 45 and the first sheet running sensor 44. However, due to the installation position deviation, the individual difference in sensitivity, and the like between the start trigger sensor 45 and the first sheet running sensor 44, a certain amount of time difference occurs at the timing when the start trigger sensor 45 and the first sheet running sensor 44 generate the edge detection outputs.

The timing when the edge detection output is generated will now be described. The first sheet running sensor 44 generates the edge detection output after the start trigger sensor 45 generates the edge detection output in some cases. Also, the start trigger sensor 45 generates the edge detection output after the first sheet running sensor 44 generates the edge detection output in some cases. Furthermore, the start trigger sensor 45 and the first sheet running sensor 44 may generate the edge detection outputs approximately at the same time. The examples of signals designated by reference characters c and d in FIG. 8 are when the first sheet running sensor 44 has first generated the edge detection output.

The image forming apparatus 1 according to the present embodiment includes OR gate and AND gate. The edge detection output of the start trigger sensor 45 and the edge detection output of the first sheet running sensor 44 are supplied to the OR gate as well as to the AND gate. When both or either of the edge detection outputs of the start trigger sensor 45 and the first sheet running sensor 44 is a high level, the output of the OR gate becomes a high level as illustrated at time t1 of the signal waveform designated by reference character e in FIG. 8. In other words, while the sheet 39 is passing in front of the start trigger sensor 45 and the first sheet running sensor 44, the output of the OR gate becomes a high level, as illustrated at time t1 of the signal waveform designated by reference character e in FIG. 8.

As illustrated at time t1 of the signal waveform designated by reference character g in FIG. 8, the judging unit 88 illustrated in FIG. 3 starts counting the pulse signals generated by the encoder sensor 43, at the timing when the output of the OR gate becomes a high level. The judging unit 88 counts the pulse signals until a high level signal is output from the AND gate, or when the count value of the pulse signals becomes the count value indicating that a predetermined time has passed. The counting time of the pulse signals is a first monitoring time that monitors whether the start trigger sensor 45 detects the leading edge 39a of the sheet 39, after the first sheet running sensor 44 has detected the leading edge 39a of the sheet 39.

In other words, in the image forming apparatus 1 according to the present embodiment, the non-directional reflection-type optical sensor is used for the first sheet running sensor 44 and the second sheet running sensor 46 as described above. Thus, the edge detection accuracy of the sheet 39 is not very high. However, regardless of the paper type of the sheet 39, the first sheet running sensor 44 and the second sheet running sensor 46 can accurately detect whether the sheet 39 has passed in front of the first sheet running sensor 44 and the second sheet running sensor 46. Consequently, even if the sheet 39 to which the front-back magnification correction is difficult to apply, is conveyed, and even if the start trigger sensor 45 cannot detect the leading edge 39a of the sheet 39, the first sheet running sensor 44 can detect the leading edge 39a of the sheet 39.

Hence, when the sheet 39 to which the front-back magnification correction is difficult to apply, is conveyed, the edge detection output of the first sheet running sensor 44 is generated before the edge detection output of the start trigger sensor 45. However, as described above, due to the installation position deviation, the individual difference in sensitivity, and the like between the start trigger sensor 45 and the first sheet running sensor 44, a certain amount of time difference occurs at the timing when the start trigger sensor 45 and the first sheet running sensor 44 generate the edge detection outputs. A period of time a little longer than the time difference is the first monitoring time to monitor whether the start trigger sensor 45 has detected the leading edge 39a of the sheet 39. For example, in the image forming apparatus 1 according to the present embodiment, 4 μsec is set for the first monitoring time.

When the monitoring starts at time t1, the judging unit 88 monitors whether a high-level signal is supplied from the AND gate, within the first monitoring time of 4 μsec. When it is possible to apply the front-back magnification correction on the sheet 39, the edge detection output of the first sheet running sensor 44 becomes a high level within the first monitoring time of 4 μsec, and a high-level signal is output from the AND gate. Thus, as illustrated at time t2 of the signal waveform designated by reference character f in FIG. 8, the judging unit 88 stops counting the pulse signals generated by the encoder sensor 43, upon detecting that the output from the AND gate has become a high level, within the first monitoring time of 4 μsec.

In other words, when the output from the AND gate becomes a high level within the first monitoring time of 4 μsec, it means that the start trigger sensor 45 and the first sheet running sensor 44 have detected the leading edge 39a of the sheet 39. Hence, the first interruption signal, which is generated when the start trigger sensor 45 cannot detect the leading edge 39a of the sheet 39 within the first monitoring time after the first sheet running sensor 44 has detected the leading edge 39a of the sheet 39, remains a low level as illustrated by the signal waveform designated by reference character i in FIG. 8. The first monitor signal, which becomes a high level from when the first interruption signal is generated until when the stop trigger sensor 47 or the second sheet running sensor 46 have detected the leading edge 39a of the sheet 39 to be conveyed next, also remains a low level, as illustrated by the signal waveform designated by reference character h in FIG. 8.

When the first interruption signal is a low level, it means that the start trigger sensor 45 and the first sheet running sensor 44 have detected the leading edge 39a of the sheet 39. Thus, the judging unit 88 judges that it is possible to apply the front-back magnification correction on the sheet 39.

The signal waveform designated by reference character a in FIG. 8 is the signal waveform of the stop trigger sensor 47. The signal waveform designated by reference character b in FIG. 8 is the signal waveform of the second sheet running sensor 46. As with the start trigger sensor 45 and the first sheet running sensor 44, a certain amount of time difference occurs at the timing when the stop trigger sensor 47 and the second sheet running sensor 46 generate the edge detection outputs. This is due to the installation position deviation, the individual difference in sensitivity, and the like. The examples of the signal waveforms designated by reference characters a and b in FIG. 8 indicate that the stop trigger sensor 47 has detected the leading edge 39a of the sheet 39 to be conveyed next before the first sheet running sensor 44.

As illustrated at time t3 of the signal waveform designated by reference character a in FIG. 8, when the stop trigger sensor 47 detects the leading edge 39a of the sheet 39 to be conveyed next, the judging unit 88 generates a pulse-like clear signal as illustrated at time t3 of the signal waveform designated by reference character j in FIG. 8. Then, as illustrated at time t4 of the signal waveform designated by reference character g in FIG. 8, with the clear signal, the judging unit 88 clears (initializes) the count value of the pulse signals of the encoder sensor 43, which is used for monitoring during the first monitoring time of 4 μsec described above, to "0" (initialization).

The judging unit 88 counts the pulse signals corresponding to the first monitoring time of 4 μsec described above, at the timing when the sheet 39 to be conveyed next has passed in front of the start trigger sensor 45 and the first sheet running sensor 44. When the start trigger sensor 45 detects the leading edge 39a of the sheet 39 within the first monitoring time of 4 μsec (when a high-level output is obtained from the AND gate), the judging unit 88 judges that it is possible to apply the front-back magnification correction on the sheet 39 currently being conveyed.

Figure 9:
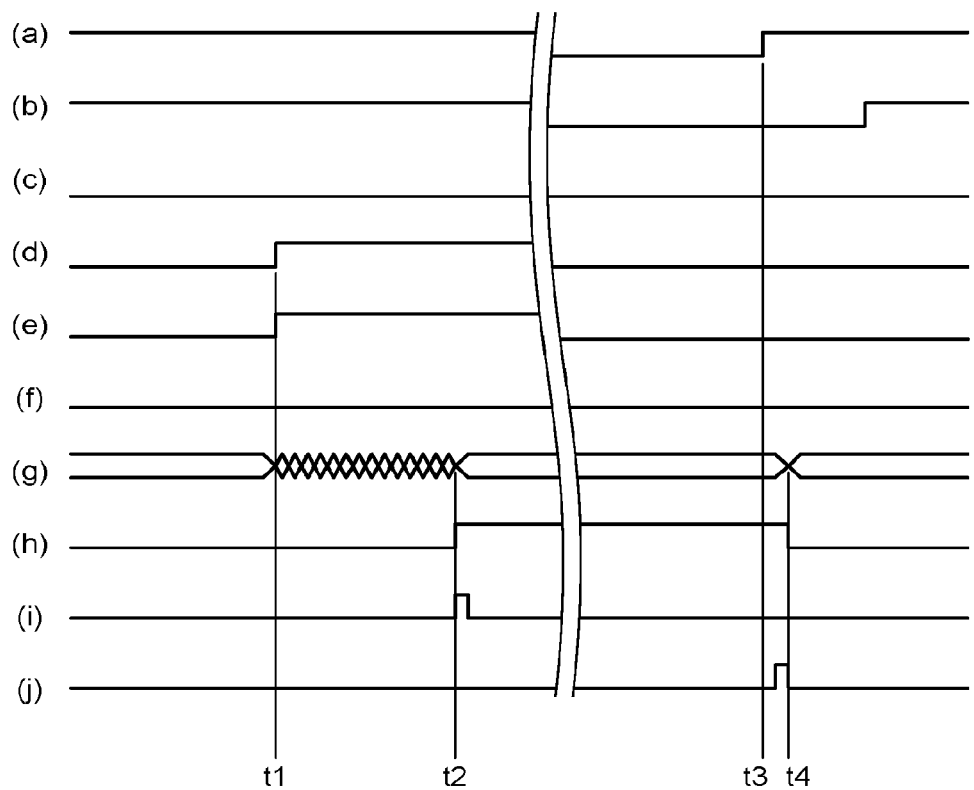
FIG. 9 is a schematic illustrating signal waveforms of signals corresponding to the detection of the leading edge of a sheet, when the sheet to which the front-back magnification correction is difficult to apply, is conveyed in the image forming apparatus according to the present embodiment.

FIG. 9 illustrates signal waveforms of signals, when the sheet 39, the edges of which are difficult to detect, such as a transparent OHP sheet or a black paper is conveyed. In this case, as illustrated by the signal waveform designated by reference character c in FIG. 9, the start trigger sensor 45 cannot detect the leading edge 39a of the sheet 39. Thus, the edge detection output of the start trigger sensor 45 remains a low level.

On the other hand, the first sheet running sensor 44 is a non-directional reflection-type optical sensor. Thus, even if the sheet 39 currently being conveyed is a sheet the edges of which are difficult to detect by the start trigger sensor 45, the first sheet running sensor 44 accurately detects whether the sheet 39 has passed. Hence, as illustrated at time t1 of the signal waveform designated by reference character d in FIG. 9, a high-level edge detection output is generated, at the timing when the sheet 39 has passed in front of the first sheet running sensor 44. Then, as illustrated at time t1 of the signal waveform designated by reference character e in FIG. 9, the output of the OR gate makes a transition to a high level, at the timing when the edge detection output of the first sheet running sensor 44 makes a transition to a high level. As illustrated at time t1 of the signal waveform designated by reference character g in FIG. 9, the judging unit 88 starts counting the pulse signals generated by the encoder sensor 43, at the timing when the output of the OR gate makes a transition to a high level.

Next, the judging unit 88 monitors whether a high-level signal is supplied from the AND gate, within the first monitoring time of 4 μsec. In this case, as illustrated by the signal waveform designated by reference character f in FIG. 9, because the edge of the sheet is difficult to detect by the start trigger sensor 45, a high-level signal is not output from the AND gate and remains a low level. The judging unit 88 then counts the pulse signals corresponding to the first monitoring time of 4 μsec.

At time t2 of the signal waveform designated by reference character g in FIG. 9, when the pulse signals corresponding to the first monitoring time of 4 μsec are counted, the judging unit 88 identifies that the start trigger sensor 45 cannot detect the edge of the sheet within the first monitoring time, and stops counting the pulse signals. At time t2 of the signal waveform designated by reference character i in FIG. 9, the judging unit 88 generates a high-level pulse-like first interruption signal, when the start trigger sensor 45 cannot detect the leading edge 39a of the sheet 39. As illustrated at time t2 of the signal waveform designated by reference character h in FIG. 9, the judging unit 88 also transitions the first monitor signal to a high level, which becomes a high level from when the first interruption signal is generated until when the stop trigger sensor 47 or the second sheet running sensor 46 detects the leading edge 39a of the sheet 39 to be conveyed next.

When the high-level first interruption signal is generated, it means that the start trigger sensor 45 cannot detect the leading edge 39a of the sheet 39. Thus, the judging unit 88 judges that it is difficult to apply the front-back magnification correction on the sheet 39. In this case, because the leading edge 39a and the trailing edge 39b of the sheet 39 cannot be detected, the notifying unit 85 notifies a user that the sheet length of the current sheet 39 cannot be calculated, via the operation panel 67. The notifying unit 85 also urges a user to input a desirable front-back magnification correction value relative to the sheet 39 to which the front-back magnification correction is difficult to apply, via the operation panel 67.

The user inputs a desirable front-back magnification correction value via the operation panel 67. The front-back magnification correction value input by the user is stored in the storage unit, such as the HDD 54 or the RAM 53. The CPU 51, which is an example of an acquiring unit and a correction unit, reads out the front-back magnification correction value input by the user, from the storage unit such as the HDD 54 or the RAM 53. Thus, even if the sheet 39, the leading edge 39a of which is difficult to detect, is a transparent OHP sheet, a black paper, or the like, the sheet 39 can be processed by an optimum front-back magnification correction value input by the user.

The signal waveform designated by reference character a in FIG. 9 is the signal waveform of the stop trigger sensor 47. The signal waveform designated by reference character b in FIG. 9 is the signal waveform of the second sheet running sensor 46. As with the start trigger sensor 45 and the first sheet running sensor 44, a certain amount of time difference occurs at the timing when the stop trigger sensor 47 and the second sheet running sensor 46 generate the edge detection outputs. This is due to the installation position deviation, the individual difference in sensitivity, and the like. The examples of the signal waveforms designated by reference characters a and b in FIG. 9 indicate that the stop trigger sensor 47 has detected the leading edge 39a of the sheet 39 to be conveyed next before the first sheet running sensor 44.

As illustrated at time t3 of the signal waveform designated by reference character a in FIG. 9, when the stop trigger sensor 47 detects the leading edge 39a of the sheet 39 to be conveyed next, the judging unit 88 generates a pulse-like clear signal, as illustrated at time t3 of the signal waveform designated by reference character j in FIG. 9. As illustrated at time t4 of the signal waveform designated by reference character g in FIG. 9, with the clear signal, the judging unit 88 clears (initializes) the count value of the pulse signals of the encoder sensor 43, which is used for monitoring during the first monitoring time of 4 μsec described above, to "0". Also, as illustrated at time t4 of the signal waveform designated by reference character h in FIG. 9, the judging unit 88 transitions the first monitor signal, which has transitioned to a high level, to a low level, with the clear signal.

The judging unit 88 then counts the pulse signals corresponding to the first monitoring time of 4 μsec described above, at the timing when the sheet 39 to be conveyed next has passed in front of the start trigger sensor 45 and the first sheet running sensor 44. When the start trigger sensor 45 does not detect the leading edge 39a of the sheet 39 within the first monitoring time of 4 μsec (when a high-level output is not obtained from the AND gate), the judging unit 88 judges that it is difficult to apply the front-back magnification correction on the sheet 39 currently being conveyed.

Figure 10:
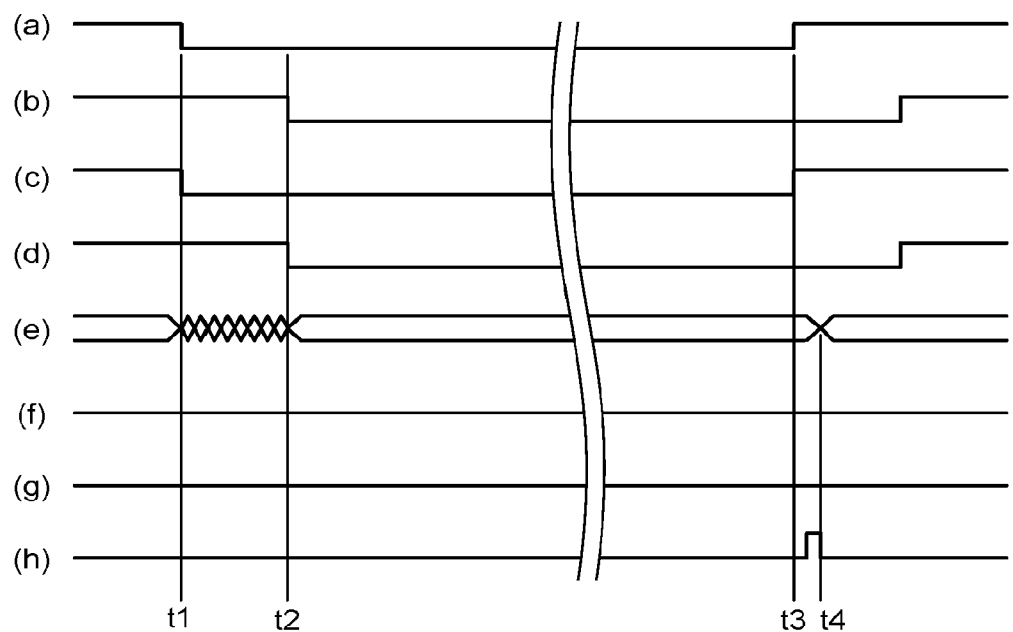
FIG. 10 is a schematic illustrating signal waveforms of signals corresponding to the detection of the trailing edge of a sheet, when the sheet to which the front-back magnification correction can be applied, is conveyed in the image forming apparatus according to the present embodiment.

FIG. 10 illustrates signal waveforms of signals when the sheet 39 to which the front-back magnification correction can be applied, is conveyed. In this case, while the sheet 39 being conveyed is passing in front of the stop trigger sensor 47 and the second sheet running sensor 46, the edge detection outputs of the stop trigger sensor 47 and the second sheet running sensor 46 both become a high level. Then, as illustrated by the signal waveform designated by reference character a in FIG. 10, at the timing of time t1 when the stop trigger sensor 47 detects the trailing edge 39b of the sheet 39 being conveyed, the edge detection output, which has been a high level up to then, makes a transition to a low level.

Similarly, as illustrated by the signal waveform designated by reference character b in FIG. 10, at the timing of time t2 when the second sheet running sensor 46 detects the trailing edge 39b of the sheet 39 being conveyed, the edge detection output, which has been a high level up to then, makes a transition to a low level. The examples of the signal waveforms designated by reference characters a and b in FIG. 10 indicate that the stop trigger sensor 47 has detected the trailing edge 39b of the sheet 39 before the second sheet running sensor 46.

When either of the stop trigger sensor 47 or the second sheet running sensor 46 detects the trailing edge 39b of the sheet 39, the edge detection output makes a transition from a high level to a low level. Then, as illustrated at time t1 of the signal waveform of c in FIG. 10, the output of the AND gate makes a transition from a high level to a low level. As illustrated at time t1 of the signal waveform of e in FIG. 10, the judging unit 88 starts counting the pulse signals generated by the encoder sensor 43, at the timing when the output from the AND gate has made a transition from a high level to a low level.

As described above, a certain amount of time difference occurs at the timing when the stop trigger sensor 47 and the second sheet running sensor 46 generate the edge detection outputs. This is due to the installation position deviation, the individual difference in sensitivity, and the like between the stop trigger sensor 47 and the second sheet running sensor

46. A period of time a little longer than the time difference is a second monitoring time to monitor whether the stop trigger sensor 47 has detected the trailing edge 39b of the sheet 39. As an example, in the image forming apparatus 1 according to the present embodiment, 4 μsec is set for the second monitoring time.

When the monitoring starts at time t1, the judging unit 88 monitors whether the output of the OR gate has transitioned from a high level to a low level, within the second monitoring time of 4 μsec. When the sheet 39 is a sheet to which the front-back magnification correction can be applied, the edge detection outputs from the stop trigger sensor 47 and the second sheet running sensor 46 both become a low level, within the second monitoring time of 4 μsec. As illustrated at time t2 of the signal waveform designated by reference character d in FIG. 10, when the output of the OR gate makes a transition from a high level to a low level within the second monitoring time of 4 μsec, the judging unit 88 stops counting the pulse signals generated by the encoder sensor 43, as illustrated at time t2 of the signal waveform designated by reference character e in FIG. 10.

In other words, when the output of the OR gate becomes a low level within the second monitoring time of 4 μsec, it means that the stop trigger sensor 47 and the second sheet running sensor 46 have detected the trailing edge 39b of the sheet 39. Thus, the second interruption signal, which is generated when the stop trigger sensor 47 cannot detect the trailing edge 39b of the sheet 39 within the second monitoring time after the second sheet running sensor 46 has detected the trailing edge 39b of the sheet 39, remains a low level as illustrated by the signal waveform designated by reference character g in FIG. 10. The second monitor signal, which becomes a high level from when the second interruption signal is generated until when the stop trigger sensor 47 or the second sheet running sensor 46 detects the leading edge 39a of the sheet 39 to be conveyed next, also remains a low level as illustrated by the signal waveform designated by reference character f in FIG. 10.

When the second interruption signal is a low level, it means that the stop trigger sensor 47 and the second sheet running sensor 46 have detected the trailing edge 39b of the sheet 39. Hence, the judging unit 88 judges that it is possible to apply the front-back magnification correction on the sheet 39.

As illustrated at time t3 of the signal waveform designated by reference character a in FIG. 10, when the stop trigger sensor 47 detects the leading edge 39a of the sheet 39 to be conveyed next, the judging unit 88 generates a pulse-like clear signal, as illustrated at time t3 of the signal waveform designated by reference character h in FIG. 10. Then, as illustrated at time t4 of the signal waveform designated by reference character e in FIG. 10, with the clear signal, the judging unit 88 clears (initializes) the count value of the pulse signals of the encoder sensor 43, which is used for monitoring during the second monitoring time of 4 μsec described above, to "0".

The judging unit 88 then counts the pulse signals corresponding to the second monitoring time of 4 μsec described above, at the timing when the trailing edge 39b of the sheet 39 to be conveyed next has passed in front of the stop trigger sensor 47 or the second sheet running sensor 46. When the stop trigger sensor 47 detects the trailing edge 39b of the sheet 39 within the second monitoring time of 4 μsec (when the low level output is obtained from the OR gate), the judging unit 88 judges that it is possible to apply the front-back magnification correction on the sheet 39 currently being conveyed.

Figure 11:
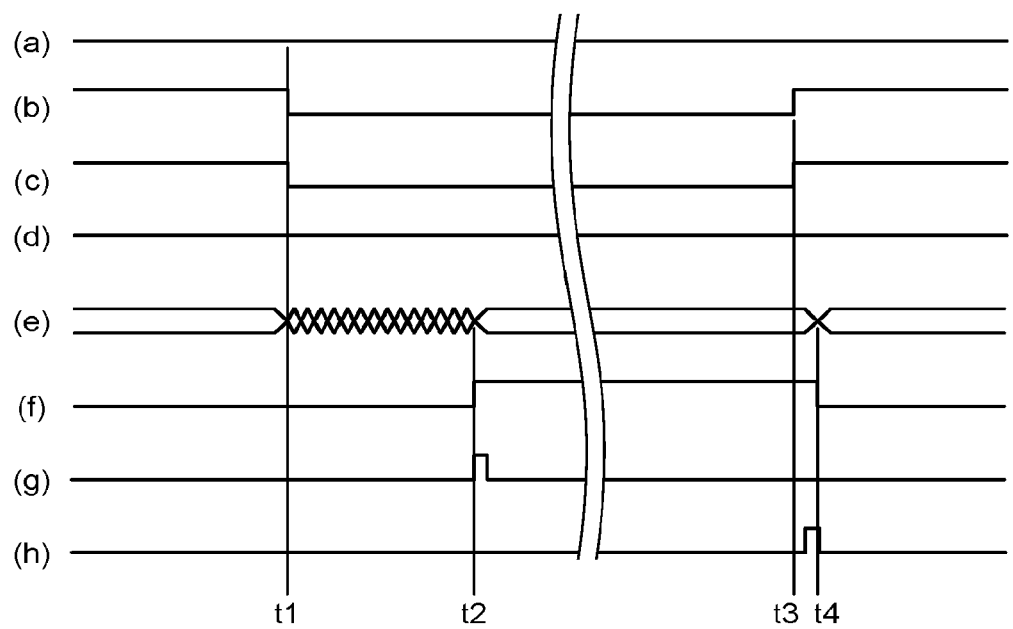
FIG. 11 is a schematic illustrating signal waveforms of signals corresponding to the detection of the trailing edge of a sheet, when the sheet to which the front-back magnification correction is difficult to apply, is conveyed in the image forming apparatus according to the present embodiment.

FIG. 11 illustrates signal waveforms of signals when the sheet 39 to which the front-back magnification correction is difficult to apply, is conveyed. In this case, the stop trigger sensor 47 cannot detect the trailing edge 39b of the sheet 39. Hence, as illustrated by the signal waveform designated by reference character a in FIG. 11, the output of the stop trigger sensor 47 continues to be a high level. On the other hand, the second sheet running sensor 46 can detect whether the sheet 39 has passed. The timing when the sheet 39 does not pass in front of the second sheet running sensor 46, is also the timing when the trailing edge 39b of the sheet 39 has passed in front of the second sheet running sensor 46. Hence, as illustrated at time t1 of the signal waveform designated by reference character b in FIG. 11, the output of the second sheet running sensor 46 makes a transition from a high level to a low level, at the timing when the trailing edge 39b of the sheet 39 has passed in front of the second sheet running sensor 46.

When the output of the second sheet running sensor 46 makes a transition to a low level, the output of the AND gate makes a transition from a high level to a low level, as illustrated at time t1 of the signal waveform designated by reference character c in FIG. 11. When the output of the AND gate makes a transition to a low level, as illustrated at time t1 of the signal waveform designated by reference character e in FIG. 11, the judging unit 88 starts counting the pulse signals generated by the encoder sensor 43.

Next, when the stop trigger sensor 47 detects the trailing edge 39b of the sheet 39 within the second monitoring time of 4 μsec described above, the output of the OR gate makes a transition from a high level to a low level. Thus, the judging unit 88 stops counting the pulse signals (refer to time t2 of each of the signal waveforms designated by reference characters d and e in FIG. 10). However, the sheet 39 currently being conveyed is the sheet 39 to which the front-back magnification correction is difficult to apply. Thus, the stop trigger sensor 47 cannot detect the trailing edge 39b of the sheet 39, and the output of the OR gate remains a high level. Hence, the judging unit 88 detects the lapse of 4 μsec described above, by counting the pulse signals. The time t2 of the signal waveform designated by reference character e in FIG. 11 illustrates time when the judging unit 88 counted the pulse signals corresponding to the second monitoring time of 4 μsec described above (time is up).

Next, because the stop trigger sensor 47 does not detect the trailing edge 39b of the sheet 39 within the second monitoring time described above after the second sheet running sensor 46 has detected the trailing edge 39b of the sheet 39, the judging unit 88 generates a pulse-like second interruption signal, as illustrated at time t2 of the signal waveform designated by reference character g in FIG. 11. Also, as illustrated at time t2 of the signal waveform designated by reference character f in FIG. 11, the judging unit 88 transitions the second monitor signal to a high level, from when the second interruption signal is generated, to when the stop trigger sensor 47 or the second sheet running sensor 46 detects the leading edge 39a of the sheet 39 to be conveyed next.

When the high-level second interruption signal is generated, it means that the stop trigger sensor 47 cannot detect the trailing edge 39b of the sheet 39. Thus, the judging unit 88 judges that it is difficult to apply the front-back magnification correction on the sheet 39. In this case, because the leading edge 39a and the trailing edge 39b of the sheet 39 cannot be detected, the notifying unit 85 notifies a user that the sheet length of the current sheet 39 cannot be calculated, via the operation panel 67. The notifying unit 85 also urges a user to input a desirable front-back magnification correction value relative to the sheet 39 to which the front-back magnification correction is difficult to apply, via the operation panel 67.

The user then inputs a desirable front-back magnification correction value via the operation panel 67. The front-back magnification correction value input by the user is stored in the storage unit such as the HDD 54 or the RAM 53. The front-back magnification correction value input by the user is read out and used the next time, when the sheet to which the front-back magnification correction is difficult to apply, is to be processed. Thus, even if the sheet 39, the leading edge 39*a* of which is difficult to detect, is a transparent OHP sheet, a black paper, or the like, the sheet 39 can be processed by an optimum front-back magnification correction value input by a user.

Next, as illustrated at time t3 of the signal waveform designated by reference character b in FIG. 11, when the second sheet running sensor 46 (or the stop trigger sensor 47) detects the leading edge 39*a* of the sheet 39 to be conveyed next, the judging unit 88 generates a pulse-like clear signal, as illustrated at time t3 of the signal waveform designated by reference character h in FIG. 11. Then, as illustrated at time t4 of the signal waveform designated by reference character e in FIG. 11, with the clear signal, the judging unit 88 clears (initializes) the count value of the pulse signals of the encoder sensor 43, which is used for monitoring during the second monitoring time of 4 μsec described above, to "0". Also, as illustrated at time t4 of the signal waveform designated by reference character f in FIG. 11, the judging unit 88 returns the second monitor signal, which has transitioned to a high level, to a low level, at the timing of the clear signal.

The judging unit 88 then counts the pulse signals corresponding to the second monitoring time of 4 μsec described above, at the timing when the trailing edge 39*b* of the sheet 39 to be conveyed next has passed in front of the stop trigger sensor 47 and the second sheet running sensor 46. When the stop trigger sensor 47 does not detect the trailing edge 39*b* of the sheet 39 within the second monitoring time of 4 μsec (when the output of the OR gate does not make a transition from a high-level to a low level), the judging unit 88 judges that it is difficult to apply the front-back magnification correction on the sheet 39 currently being conveyed.

In this manner, the image forming apparatus 1 according to the present embodiment judges that it is possible to apply the front-back magnification correction on the sheet 39 currently being conveyed, when the start trigger sensor 45 detects the leading edge 39*a* of the sheet 39, for example, within the first monitoring time of 4 μsec, to monitor the detection of the leading edge 39*a* of the sheet 39. Also, the image forming apparatus 1 according to the present embodiment judges that it is difficult to apply the front-back magnification correction on the sheet 39 currently being conveyed, when the start trigger sensor 45 does not detect the leading edge 39*a* of the sheet 39, for example, within the first monitoring time of 4 μsec, to monitor the detection of the leading edge 39*a* of the sheet 39.

The image forming apparatus 1 according to the present embodiment also judges that it is possible to apply the front-back magnification correction on the sheet 39 currently being conveyed, when the start trigger sensor 45 detects the trailing edge 39*b* of the sheet 39, for example, within the second monitoring time of 4 μsec, to monitor the detection of the trailing edge 39*b* of the sheet 39. Also, the image forming apparatus 1 according to the present embodiment judges that it is difficult to apply the front-back magnification correction on the sheet 39 currently being conveyed, when the start trigger sensor 45 does not detect the trailing edge 39*b* of the sheet 39, for example, within the second monitoring time of 4 μsec, to monitor the detection of the trailing edge 39*b* of the sheet 39.

The image forming apparatus 1 according to the present embodiment, upon identifying that it is difficult to apply the front-back magnification correction on the sheet, notifies a user that the sheet length of the current sheet 39 cannot be calculated, via the operation panel 67. Also, the image forming apparatus 1 according to the present embodiment urges a user to input a desirable front-back magnification correction value relative to the sheet 39, to which the front-back magnification correction is difficult to apply, via the operation panel 67. Hence, the image forming apparatus 1 according to the present embodiment performs the front-back magnification correction, by using the front-back magnification correction value input by the user. Thus, even if the sheet 39, the leading edge 39*a* of which is difficult to detect, is a transparent OHP sheet, a black paper, or the like, the sheet 39 can undergo the front-back magnification correction by using the optimum front-back magnification correction value input by the user.

Figure 12:
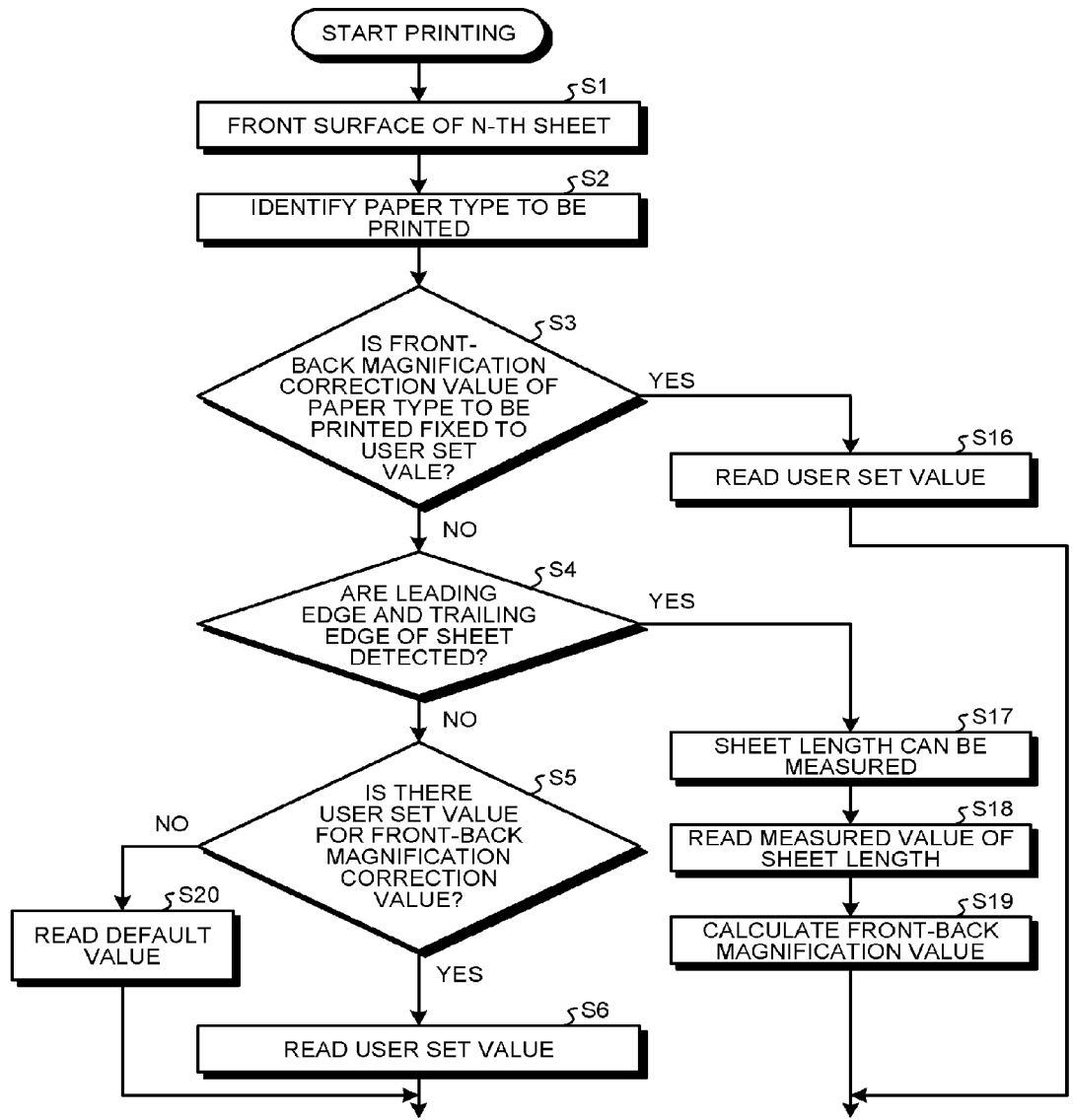
FIG. 12 is a flowchart illustrating a first half of the procedure of the printing process in the image forming apparatus according to the present embodiment.
Figure 13:
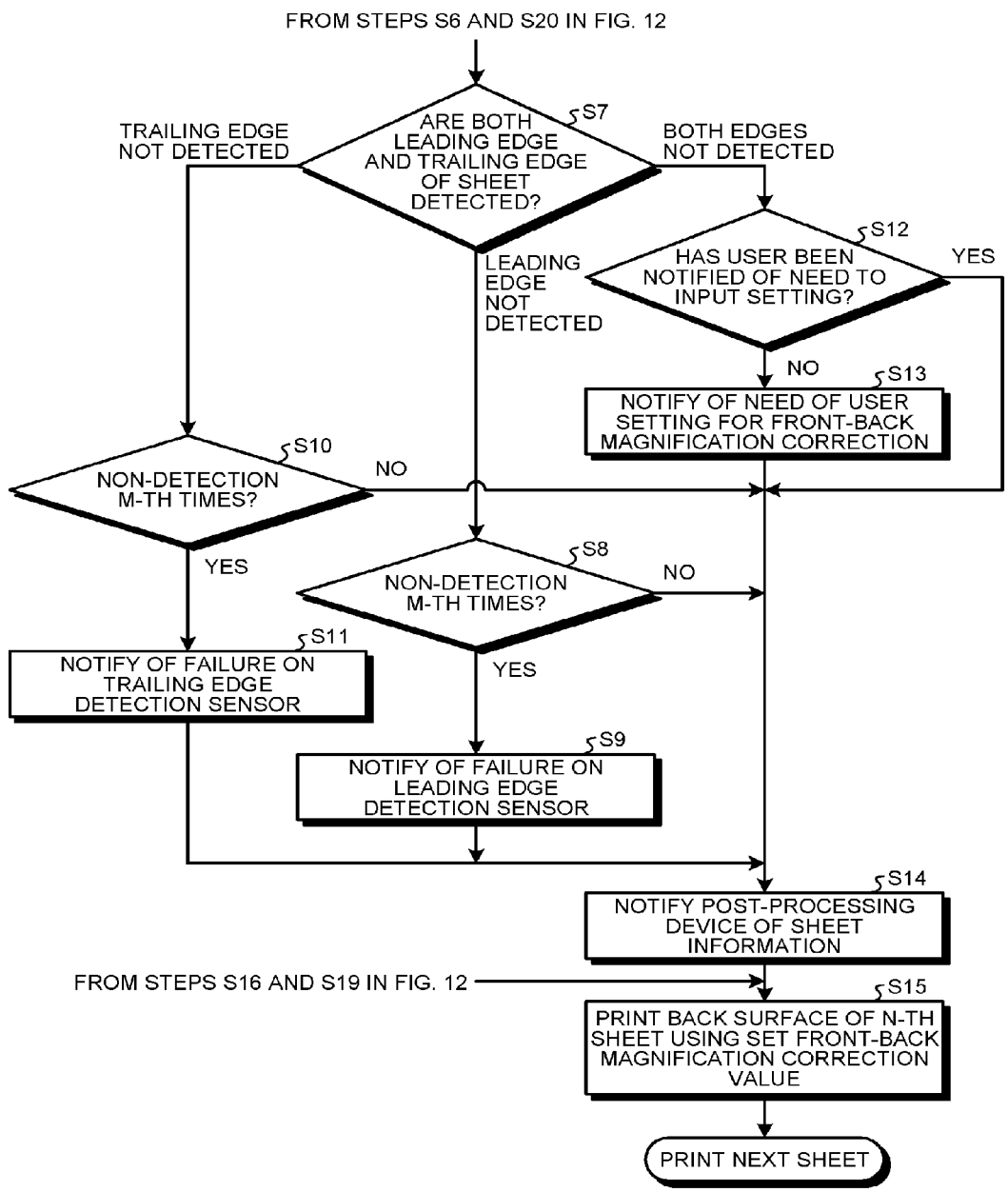
FIG. 13 is a flowchart illustrating a latter half of the procedure of the printing process in the image forming apparatus according to the present embodiment.

The printing processes in the image forming apparatus 1 according to the present embodiment are illustrated in the flowcharts of FIG. 12 and FIG. 13. FIG. 12 and FIG. 13 are flowcharts illustrating a series of the procedure of a printing process. In general, each of the paper feeding cassettes of the image forming apparatus 1 houses the sheets of the same paper type and the same size. The CPU 51 of the main body 50 manages the sheet information of the sheet 39 housed in each of the paper feeding cassettes. The sheet information includes information on the size and orientation of the sheet that can be identified automatically, information on the paper type set by a user, and the like.

When the printing is started, the CPU 51 selects a paper feeding cassette, in which the sheets suitable for the print data are housed, and controls ejection of the sheet from the selected paper feeding cassette in a page unit. The CPU 51 manages the paper feeding status of each sheet. More specifically, at the time of printing, the CPU 51 identifies the paper type of the sheet 39, the front surface of which is the N-th sheet to be printed, at step S1 and step S2.

At step S3, the CPU 51 judges whether the front-back magnification correction value of the sheet 39, the paper type of which is identified, is fixed to the user set value. When the front-back magnification correction value is fixed to the user set value (Yes at step S3), the CPU 51 reads out the user set value stored in the storage unit such as the HDD 54 or the RAM 53 at step S16, and proceeds the process to step S15 in FIG. 13. At step S15, the CPU 51 performs the front-back magnification correction process by using the user set vale being read out, and prints the back surface of the N-th sheet 39, and shifts the control to print the next sheet 39.

On the other hand, when it is judged that the front-back magnification correction value is not fixed to the user set value (No at step S3), the CPU 51 proceeds the process to step S4. At step S4, the CPU 51 judges whether the leading edge 39*a* and the trailing edge 39*b* of the sheet 39 are detected from each of the outputs from the first sheet running sensor 44, the start trigger sensor 45, the second sheet running sensor 46, the stop trigger sensor 47, the AND gate, the OR gate, and the like, as described with reference to FIG. 8 to FIG. 11. When it is judged that the leading edge 39*a* and the trailing edge 39b of the sheet 39 are detected (Yes at step S4), the CPU 51 proceeds the process to step S17.

At step S17, because both the leading edge 39a and the trailing edge 39b of the sheet 39 are detected, the determining unit 84 illustrated in FIG. 3 judges that the sheet length can be measured, and proceeds the process to step S18. In other words, when both the leading edge 39a and the trailing edge 39b of the sheet 39 are detected, the determining unit 84 estimates that an appropriate measurement of the sheet length is made. When both or either of the leading edge 39a and the trailing edge 39b of the sheet 39 cannot be detected, it is difficult to measure the sheet length. Thus, the determining unit 84 estimates that an appropriate measurement of the sheet length is not made. In this manner, the determining unit 84 determines the appropriateness of the sheet length calculated by the sheet length calculation unit 81, which will be described below, from the detection results of the leading edge 39a and the trailing edge 39b of the sheet 39.

Next, at step S18, the sheet length calculation unit 81 of the CPU 51 illustrated in FIG. 3 calculates the sheet length of the sheet 39 currently being conveyed, by calculation using the formula 1 described above. The storage control unit 83 controls storing the information on the calculated sheet length, in the storage unit such as the HDD 54 or the RAM 53. At step S18, the storage control unit 83 reads out the information on the sheet length stored in the HDD 54 and the like. At step S19, the correction value calculation unit 82 calculates the front-back magnification correction value by using the sheet length of the sheet 39 being read out. Consequently, the process proceeds to step S15 in FIG. 13. At step S15, the CPU 51 performs the front-back magnification correction process by using the calculated front-back magnification correction value, prints the back surface of the N-th sheet 39, and shifts the control to print the next sheet 39.

The correction value calculation unit 82, for example, calculates the front-back magnification correction value as follows. For example, it is assumed that the number of encoder pulses N per one rotation of the driven roller 40 is N=2800[/r], and the radius r (mm) of the driven roller 40, on which the encoder disk 42 is mounted, is r=9 [mm]. The number of pulses n1 calculated when the sheet 39 of A3 size is conveyed vertically is n1=18816. In this case, the conveying distance L1 of the sheet 39 is calculated by the formula 3 below:

$$L1=(18816/2800) \times 2\pi \times 9 = 380.00 \text{[mm]} \quad \text{(Formula 3)}$$

When the number of pulses n2, which is calculated again after the sheet 39 is thermally fixed, is n2=18759, the conveying distance L2 of the sheet 39 is calculated by the formula 4 below:

$$L2=(18759/2800) \times 2\pi \times 9 = 378.86 \text{[mm]} \quad \text{(Formula 4)}$$

The front-back difference ΔL of the conveying distance of the sheet 39 is a value expressed by the formula 5 below:

$$\Delta L = 380.00 - 378.86 = 1.14 \text{[mm]} \quad \text{(Formula 5)}$$

From the calculation result of the conveying distance of the front and back of the sheet 39, the expansion and contraction ratio R of the sheet 39 (relative ratio of the front and back length of the sheet 39) is calculated by the formula 6 below:

$$R = 378.86/380.00 = 99.70 [\%] \quad \text{(Formula 6)}$$

This example indicates that the length of the sheet 39 in the conveyance direction has shrunk by about 1 mm by thermal fixing. It means that when the lengths of an image on the front and back of the sheet 39 are made to be the same regardless of the shrinkage, a front-back misregistration of about 1 mm will occur. Thus, the correction value calculation unit 82 calculates the front-back magnification correction value for correcting the length of the image to be printed on the back surface of the sheet 39, and for correcting the front-back misregistration of about 1 mm, by using the expansion and contraction ratio R (step S19). The CPU 51 then performs the front-back magnification correction process using the calculated front-back magnification correction value, prints the back surface of the N-th sheet 39, and shifts the control to print the next sheet 39 (step S15). Hence, it is possible to print with the improved front-back registration accuracy.

When both the leading edge 39a and the trailing edge 39b of the sheet 39 cannot be detected, it is difficult to calculate the sheet length. At step S4, when it is judged that both the leading edge 39a and the trailing edge 39b of the sheet 39 cannot be detected, or when it is judged that either of the leading edge 39a and the trailing edge 39b of the sheet 39 cannot be detected (No at step S4), the CPU 51 proceeds the process to step S5. At step S5, the CPU 51 determines whether a user has already set the front-back magnification correction value relative to the sheet 39, the sheet length of which is difficult to measure. When the user has already set the front-back magnification correction value (Yes at step S5), the storage control unit 83 reads out the front-back magnification correction value set by the user, from the storage unit such as the HDD 54 or the RAM 53 (step S6). Consequently, the process proceeds to step S7 in FIG. 13.

On the other hand, when the user has not set the front-back magnification correction value (No at step S5), the storage control unit 83 reads out the front-back magnification correction value set as a default value, from the storage unit such as the HDD 54 or the RAM 53 (step S20). Consequently, the process proceeds to step S7 in FIG. 13. The default value of the front-back magnification correction value is the set value applied to the paper type, the sheet length of which cannot be measured, as well as when the user has not set the front-back magnification correction value relative to the paper type the sheet length of which cannot be measured. The user can set the default value of the front-back magnification correction value via the operation panel 67 in advance.

The user can also set the front-back magnification correction value to "1 (not to perform the front-back magnification correction)". The default value of the front-back magnification correction value may also be "1 (not to perform the front-back magnification correction)".

Next, when the process proceeds to step S7 in FIG. 13, the failure detection unit 87 judges the edge of the sheet 39 that cannot be detected. When it is judged that the trailing edge 39b of the sheet 39 is detected, but the leading edge 39a cannot be detected (leading edge not detected), the failure detection unit 87 proceeds the process to step S8. At step S8, the failure detection unit 87 judges whether the non-detection number of times has reached M-th times (M-th times, for example, is tenth times). In other words, the failure detection unit 87 counts the number of times that the start trigger sensor 45 cannot detect the leading edge 39a, and stores it in the storage unit such as the HDD 54 or the RAM 53. To perform the process at step S7, the failure detection unit 87 reads out and confirms the number of times that the start trigger sensor 45 cannot detect the leading edge 39a stored in the storage unit.

When the non-detection number of times stored in the storage unit has not reached M-th times (No at step S8), the failure detection unit 87 increments the non-detection number of times of the leading edge 39*a* by the start trigger sensor 45 stored in the storage unit, by "one" (adds one), and proceeds the process to step S14. When the non-detection number of times stored in the storage unit is the M-th times (Yes at step S8), the failure detection unit 87 judges that a failure has occurred on the start trigger sensor 45, and notifies the notifying unit 85. At step S9, the notifying unit 85 notifies the user that a failure has occurred on the start trigger sensor 45, for example, via the operation panel 67. Consequently, the process proceeds to step S14.

On the other hand, when it is judged that the leading edge 39*a* of the sheet 39 is detected, but the trailing edge 39*b* cannot be detected (trailing edge not detected), the failure detection unit 87 proceeds the process to step S10. At step S10, the failure detection unit 87 judges whether the non-detection number of times of the trailing edge 39*b* has reached M-th times (M-th times, for example, is tenth times). In other words, the failure detection unit 87 counts the number of times that the stop trigger sensor 47 cannot detect the trailing edge 39*b*, and stores it in the storage unit such as the HDD 54 or the RAM 53. To perform the process at step S7, the failure detection unit 87 reads out and confirms the number of times that the stop trigger sensor 47 cannot detect the trailing edge 39*b* stored in the storage unit.

When the non-detection number of times stored in the storage unit has not reached M-th times (No at step S10), the failure detection unit 87 increments the non-detection number of times of the leading edge 39*a* by the start trigger sensor 45 stored in the storage unit, by "one" (adds one), and proceeds the process to step S14. When the non-detection number of times stored in the storage unit is M-th times (Yes at step S10), the failure detection unit 87 judges that a failure has occurred on the stop trigger sensor 47, and notifies the notifying unit 85. At step S11, the notifying unit 85 notifies the user that a failure has occurred on the stop trigger sensor 47, for example, via the operation panel 67. Consequently, the process proceeds to step S14.

When it is judged that both the leading edge 39*a* and the trailing edge 39*b* of the sheet 39 cannot be detected (both edges not detected), the failure detection unit 87 notifies the notifying unit 85 and proceeds the process to step S12. When both of the leading edge 39*a* and the trailing edge 39*b* of the sheet 39 cannot be detected, it means that the sheet 39 currently being conveyed is most likely the sheet 39, the edges of which are difficult to detect, such as an OHP transparent sheet or a black paper. In this case, the front-back magnification correction value input by the user is required to perform the front-back magnification correction. Hence, at step S12, the notifying unit 85 judges whether the user has been notified of the need to input the front-back magnification correction value. More specifically, the notification information indicating whether the user has been notified, is stored in the storage unit such as the HDD 54 or the RAM 53. The notifying unit 85 judges whether the user has been notified, by detecting the notification information.

When it is judged that the user has not been notified from the notification information (No at step S12), at step S13, the notifying unit 85 urges the user to input the front-back magnification correction value, via the operation panel 67, and proceeds the process to step S14. When it is judged that the user has been notified from the notification information (Yes at step S12), the notifying unit 85 proceeds the process directly to step S14.

At step S14, the notifying unit 85 notifies the separate ejection control unit 86 (post-processing device) that it is not possible to detect the "leading edge 39*a* or the trailing edge 39*b*" or the "leading edge 39*a* and the trailing edge 39*b*" of the sheet 39 currently being conveyed. The separate ejection control unit 86 controls ejection of the sheet, the edges of which cannot be detected, to a paper ejection tray different from the paper ejection tray usually used for ejecting sheets. The separate ejection control unit 86 can also control ejection of the sheet 39, the edges of which cannot be detected, by shifting it. Hence, it is possible to separately eject the sheet to which the front-back magnification correction is difficult to apply, and the sheet to which the front-back magnification correction can be applied. Consequently, the user can easily judge the sheet to which the front-back magnification correction is difficult to apply.

Finally, at step S15, the CPU 51 performs the front-back magnification correction process by using the front-back magnification correction value set by the user, prints the back surface of the N-th sheet 39, and shifts the control to print the next sheet 39.

Here, the image forming apparatus 1 according to the present embodiment detects the edge of a sheet during the first monitoring time and the second monitoring time as described above. However, when the edge is detected outside the monitoring time as the above, the length of the sheet 39 in the conveyance direction is not measured, because the detection time of the edge is outside the monitoring time. Thus, there is a possibility that an appropriate front-back magnification correction may not be performed.

The determination of whether the sheet length of the sheet 39 cannot be measured is made after the monitoring time described above has passed. Hence, when the monitoring time described above is set long, the notification of the determination result to the CPU 51 that the sheet length cannot be measured, will be inevitably delayed. When the notification of the determination result to the CPU 51 is delayed, there is a possibility that the image forming apparatus 1 becomes unstable, because the notification to interrupt command processing in software (printing operation sequence) will not arrive in time. There is also a possibility of causing problems such as a system crash. Furthermore, there is a possibility that it may be treated as not measurable in the log processing (recording the history of processing contents, warnings, and the like) performed in software, and the measuring results may not be correctly reflected.

In this manner, the image forming apparatus 1 according to the present embodiment sets a proper value for the monitoring time described above, based on the actual measurement, by conveying at least one sheet 39 the edge of which is detectable, during the quality assurance process before the product is shipped out or after the product is installed at the delivery destination. By doing so, a proper value for the monitoring time can be set based on the actual measurement, and not by a reasonable value of the monitoring time logically obtained. Thus, it is possible to set the monitoring time of each image forming apparatus 1 to an appropriate time, without taking into account the assembling tolerance of the image forming apparatus 1, variations in the sheet edge detection accuracy by sensors, which will be described below, and the sheet conveyance speed.

Figure 14:
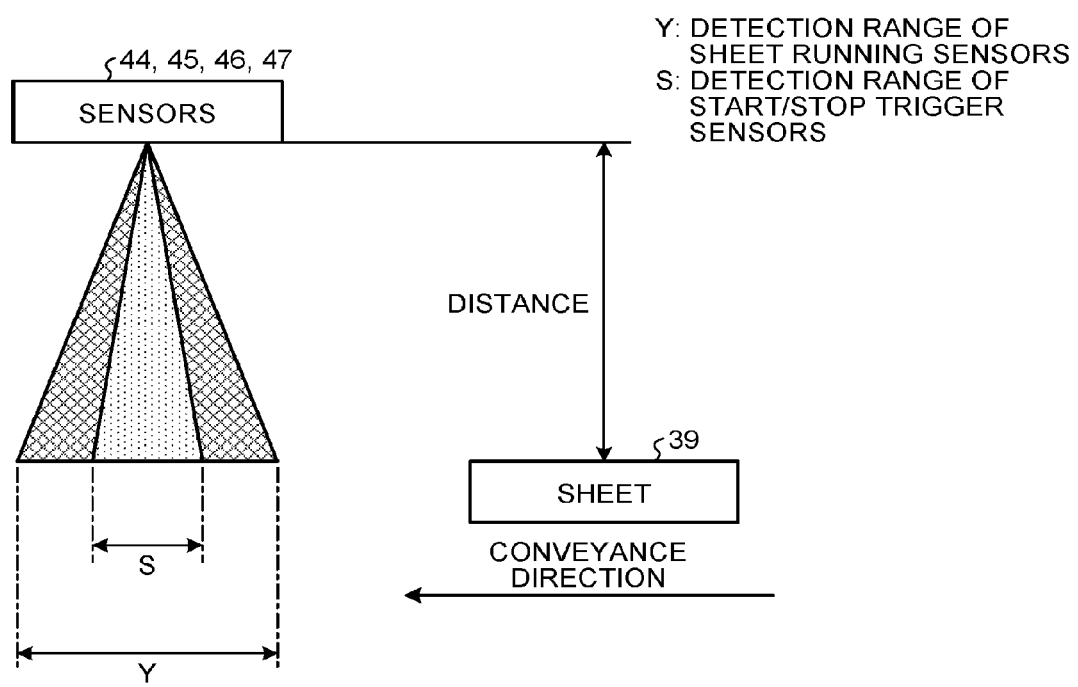
FIG. 14 is a schematic diagram for explaining different detection ranges of sensors.

With reference to FIG. 14, a sensor detection range, which will be a factor in variations in the sheet edge detection accuracy by sensors, will now be described. The "sensors" illustrated in FIG. 14 indicate the encoder sensor 43, the first sheet running sensor 44, the start trigger sensor 45, the second sheet running sensor 46, and the stop trigger sensor 47. As described above, the image forming apparatus 1 according to the present embodiment includes the first sheet running sensor 44 and the second sheet running sensor 46 in addition to the start trigger sensor 45 and the stop trigger sensor 47. The detection range of the start trigger sensor 45 and the stop trigger sensor 47 is a detection range S indicated in FIG. 14. The detection range of the first sheet running sensor 44 and the second sheet running sensor 46 is a detection range Y, which is larger than the detection range S. Because of the difference in the detection ranges depending on the sensors, differences occur in the detection timing.

Due to the variations in the sensors themselves, the assembly variations of the sensors in the distance direction, the assembly variations in the angle direction, and the like, the detection timing of each image forming apparatus 1 is different. However, the variations in the detection timing of each image forming apparatus 1 such as those described above is a fixed detection timing as a single image forming apparatus 1. Thus, it is possible to adjust the detection timing based on the detection results of the edge and the like, by conveying the sheet 39 in the image forming apparatus 1.

Figure 15:
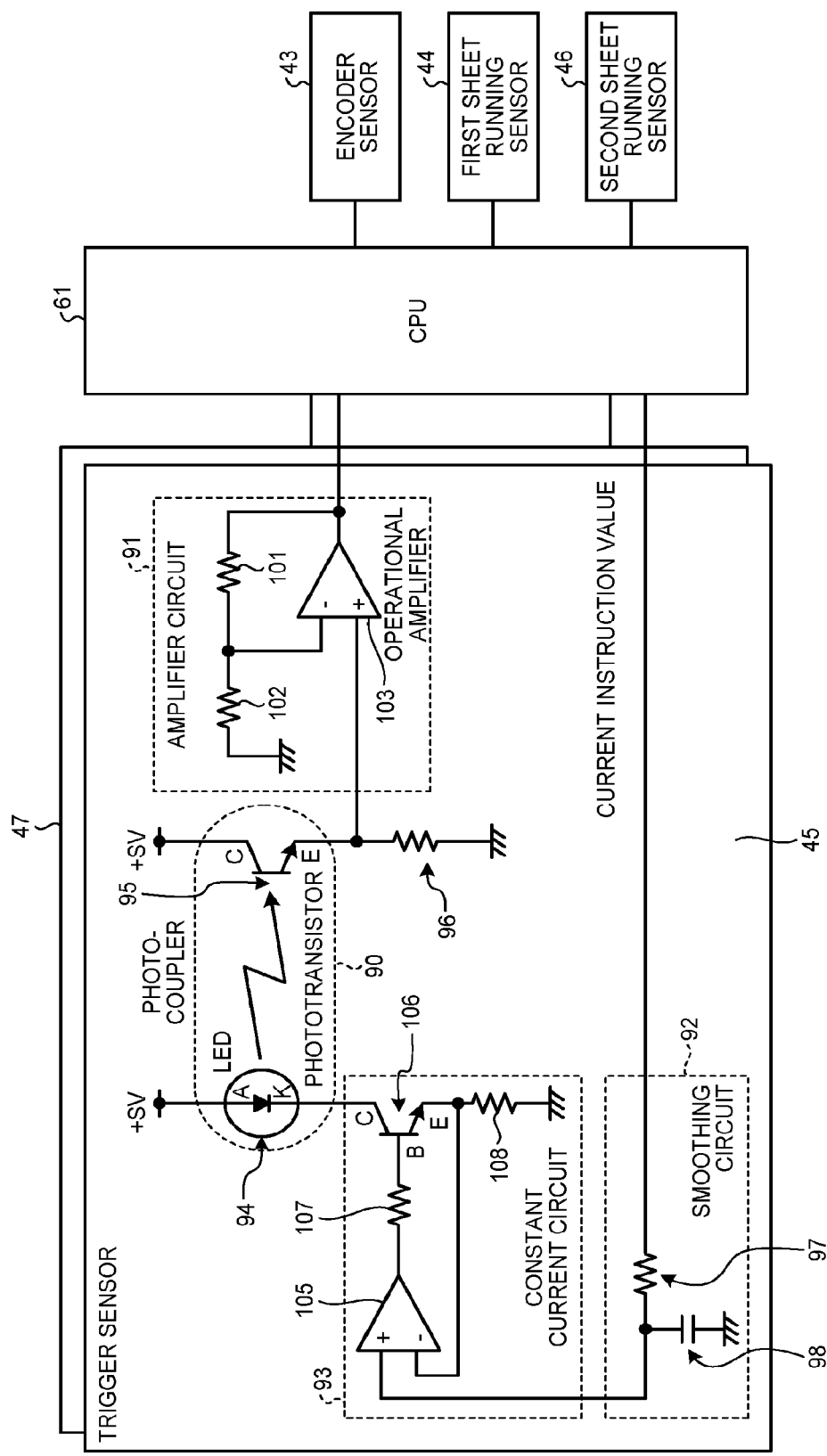
FIG. 15 is a circuit configuration diagram of a detection system in the image forming apparatus according to the present embodiment.

FIG. 15 is a circuit configuration diagram of a detection system of the sheet 39 provided in the image forming apparatus 1. As illustrated in FIG. 15, in the image forming apparatus 1, the encoder sensor 43, the first sheet running sensor 44, the start trigger sensor 45, the second sheet running sensor 46, and the stop trigger sensor 47 are connected to the CPU 51 of the main body 50.

The start trigger sensor 45 includes a photocoupler 90, an amplifier circuit 91, a smoothing circuit 92, and a constant current circuit 93. The photocoupler 90 has a light emitting diode (LED) 94 and a phototransistor 95. An anode (A) of the LED 94 is connected to a constant voltage power line of +5 volts (V). A cathode (K) of the LED 94 is connected to a collector (C) of the transistor 106 of a constant current circuit, which will be described below. A collector (C) of the phototransistor 95 of the photocoupler 90 is connected to a constant voltage power line of +5 volts. An emitter (E) of the phototransistor 95 is connected to a ground line via an emitter resistor 96.

The amplifier circuit 91 is what is called a non-inverting amplifier circuit, and includes voltage dividing resistors 101 and 102, and an operational amplifier 103. The voltage dividing resistors 101 and 102 are connected in series. One end of the voltage dividing resistor 101 is connected to an output line of the operational amplifier 103. Another end of the voltage dividing resistor 102 is connected to a ground line. An inverting input terminal (−) of the operational amplifier 103 is connected between the connection of the voltage dividing resistors 101 and 102. A non-inverting input terminal (+) of the operational amplifier 103 is connected between the connection of the collector (C) of the phototransistor 95 of the photocoupler 90, and the resistor 96. In other words, the output of the phototransistor 95 can be extracted from between the collector (C) and the resistor 96, and the extracted output is supplied to the non-inverting input terminal (+) of the operational amplifier 103. The output of the operational amplifier 103 is also supplied to the CPU 51.

The smoothing circuit 92 includes a resistor 97 (R) connected in series to the output line of a current instruction value signal output from the CPU 51, and a smoothing capacitor 98 (C) connected in parallel to the output line between the end of the resistor 97 at the side opposite from the CPU and a ground line (resistor-capacitor (RC) filter).

The constant current circuit 93 includes an operational amplifier 105 and a transistor 106. The non-inverting input terminal (+) of the operational amplifier 105 is connected to a connection point between the resistor 97 and the smoothing capacitor 98. The collector (C) of the transistor 106 is connected to the cathode (K) of the LED 94, and the emitter (E) is connected to a ground line via a resistor 108. The output of the transistor 106 extracted from between the emitter (E) and the resistor 108 is returned to the inverting input terminal (−) of the operational amplifier 105. The output terminal of the operational amplifier 105 is connected to the base of the transistor 106 via a resistor 107.

In the thus-configured start trigger sensor 45, the CPU 51 generates the current instruction value signal of the LED 94 in the photocoupler 90, for example, by a pulse width modulation (PWM) signal or an analog level output from a digital-to-analog (DA) converter. The current instruction value signal is smoothed by the smoothing circuit 92, which serves as an RC filter, and supplied to the operational amplifier 105 of the constant current circuit 93. The operational amplifier 105 supplies a differential voltage value, which is a differential between the voltage value corresponding to the amount of current flowing in the transistor 106, and the voltage value corresponding to the amount of current instructed by the current instruction value signal, to the base (B) of the transistor 106, and turns on the transistor 106. Thus, the transistor 106 can be controlled and turned on, so that the amount of current instructed by the current instruction value signal will flow therein. Hence, the LED 94 can be driven for illumination by the constant current instructed by the current instruction value signal.

The output from the phototransistor 95 of the photocoupler 90 becomes a high level, while it is receiving light from the LED 94. The output therefrom becomes a low level while it is not receiving light from the LED 94. The output of the thus-configured phototransistor 95 is amplified by the non-inverting amplifier circuit 91, and supplied to the CPU 51. In this manner, while the phototransistor 95 of the photocoupler 90 is receiving light from the LED 94, a high level output is supplied to the CPU 51. While the phototransistor 95 is not receiving light from the LED 94, a low level output is supplied to the CPU 51.

In other words, when the sheet 39 is not passing between the LED 94 and the phototransistor 95 of the photocoupler 90, a high level start trigger pulse is supplied to the CPU 51. When the sheet 39 is passing between the LED 94 and the phototransistor 95 of the photocoupler 90, a low level start trigger pulse is supplied to the CPU 51.

When an analog-digital converter is provided on the CPU 51, the output from the operational amplifier 103 is supplied directly to the CPU 51. In this case, the output from the operational amplifier 103 is analog-digital converted and processed by the CPU 51. When the analog-digital converter is not provided on the CPU 51, the output from the operational amplifier 103 is binarized by being compared with a threshold by a comparator, and supplied to the CPU 51 to be processed.

In this example, the output from the phototransistor 95 is supplied to the non-inverting amplifier circuit 91. Thus, when the sheet 39 is not passing between the LED 94 and the phototransistor 95 of the photocoupler 90, a high level start trigger pulse is supplied to the CPU 51. When the sheet 39 is passing between the LED 94 and the phototransistor 95 of the photocoupler 90, a low level start trigger pulse is supplied to the CPU 51. However, with an inverting amplifier circuit serving as an amplifier circuit for supplying the output of the phototransistor 95, when the sheet 39 is not passing between the LED 94 and the phototransistor 95 of the photocoupler 90, a low level start trigger pulse is supplied to the CPU 51. In this case, when the sheet 39 is passing between the LED 94 and the phototransistor 95 of the photocoupler 90, a high level start trigger pulse is supplied to the CPU 51. Any of the non-inverting amplifier circuit 91 and the inverting amplifier circuit may be used.

The stop trigger sensor 47 also has the same circuit configuration as that of the start trigger sensor 45 and is operated in the same way. See the descriptions on the start trigger sensor 45 described above for details.

In the thus-configured detection system, the CPU 51 detects the sheet length of the sheet 39 and adjusts the monitoring times (first monitoring time and second monitoring time) of the detection outputs from the start trigger sensor 45 and the stop trigger sensor 47. The CPU 51 also counts the number of encoder pulses, judges whether the start trigger sensor 45 and the stop trigger sensor 47 have detected the sheet 39, and controls the current through the LED 94 in the photocoupler 90 by the start trigger sensor 45 and the stop trigger sensor 47, which will be described below.

Figure 16:
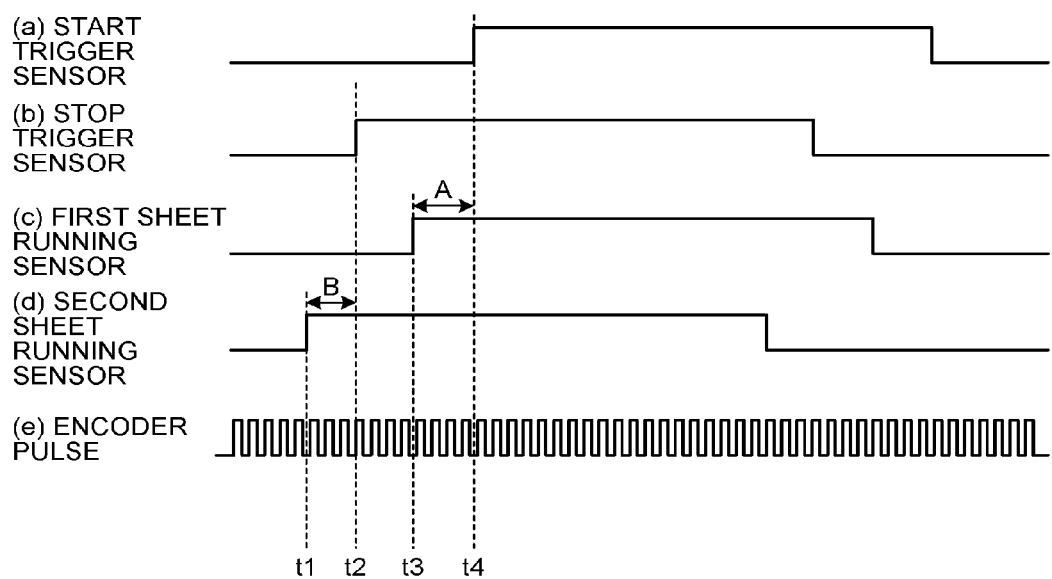
FIG. 16 is a timing chart of outputs from the sensors in the image forming apparatus according to the present embodiment.

Next, FIG. 16 depicts a timing chart of outputs from the sensors 43 to 47. The waveform designated by reference character (a) in FIG. 16 is an output waveform of the start trigger sensor 45. The waveform designated by reference character (b) in FIG. 16 is an output waveform of the stop trigger sensor 47. The waveform designated by reference character (c) in FIG. 16 is an output waveform of the first sheet running sensor 44. The waveform designated by reference character (d) in FIG. 16 is an output waveform of the second sheet running sensor 46. The waveform designated by reference character (e) in FIG. 16 is an output waveform of the encoder sensor 43.

In FIG. 16, the high-level output is an output while each of the sensors 43 to 47 is detecting the sheet 39 (sheet is present), and the low-level output is an output when each of the sensors 43 to 47 is not detecting the sheet 39 (sheet is absent). The logic of the presence of the sheet such as the one described above changes according to whether each of the sensors 43 to 47 is a reflection type sensor or a transmission type sensor, the configuration of the circuit being used, and the like.

The CPU 51 detects time B, which is from time t1 to time t2. The time t1 is when the edge detection output of the second sheet running sensor 46, which is designated by reference character (d) in FIG. 16, becomes a high level. The time t2 is when the edge detection output of the stop trigger sensor 47, which is designated by reference character (b) in FIG. 16, becomes a high level. The CPU 51, based on the detected time B, adjusts the second monitoring time described above, during which a high-level edge detection output of the stop trigger sensor 47, which is designated by reference character (b) in FIG. 16, is detected as a valid detection output, from the time t1 when the edge detection output of the second sheet running sensor 46 becomes a high level.

Similarly, the CPU 51 detects time A, which is from time t3 to time t4. The time t3 is when the edge detection output of the first sheet running sensor 44, which is designated by reference character (c) in FIG. 16, becomes a high level. The time t4 is when the edge detection output of the start trigger sensor 45, which is designated by reference character (a) in FIG. 16, becomes a high level. Based on the detected time A, the CPU 51 adjusts the first monitoring time described above, during which a high-level edge detection output of the start trigger sensor 45 is detected as a valid detection output, from the time t3 when the edge detection output of the first sheet running sensor 44 becomes a high level.

The CPU 51 may also adjust the second monitoring time described above, based on the number of encoder pulses between the time t1 and time t2 (time B) illustrated in the diagram designated by reference character (e) in FIG. 16, which is counted by the encoder sensor 43. In other words, the number of encoder pulses indicates the conveyance amount of the sheet 39. Hence, the CPU 51 sets the second monitoring time described above, as the monitoring conveyance amount indicated by the number of encoder pulses. The CPU 51 then adjusts the monitoring conveyance amount (number of pulses to be counted) equivalent to the second monitoring time described above, based on the number of encoder pulses between the time t1 and time t2 (time B) illustrated in the diagram designated by reference character (e) in FIG. 16, which is counted by the encoder sensor 43. In this manner, by adjusting the monitoring conveyance amount based on the number of pulses, it is possible to prevent a problem caused by the conveyance speed of the sheet 39. Similar effects can be obtained when the first monitoring time described above is adjusted as the monitoring conveyance amount indicated by the number of encoder pulses.

In the example in FIG. 16, the edge detection output of the first sheet running sensor 44 or the second sheet running sensor 46 is detected first, followed by the detection of the edge detection output of the strop trigger sensor 47 or the start trigger sensor 45. In this case, the edge detection output of the first sheet running sensor 44 or the second sheet running sensor 46 detected first may be made as the starting point of the time A or time B described above. It is also possible to make any of the sensors 44 to 47 as the starting point of the time A or time B.

Figure 17:
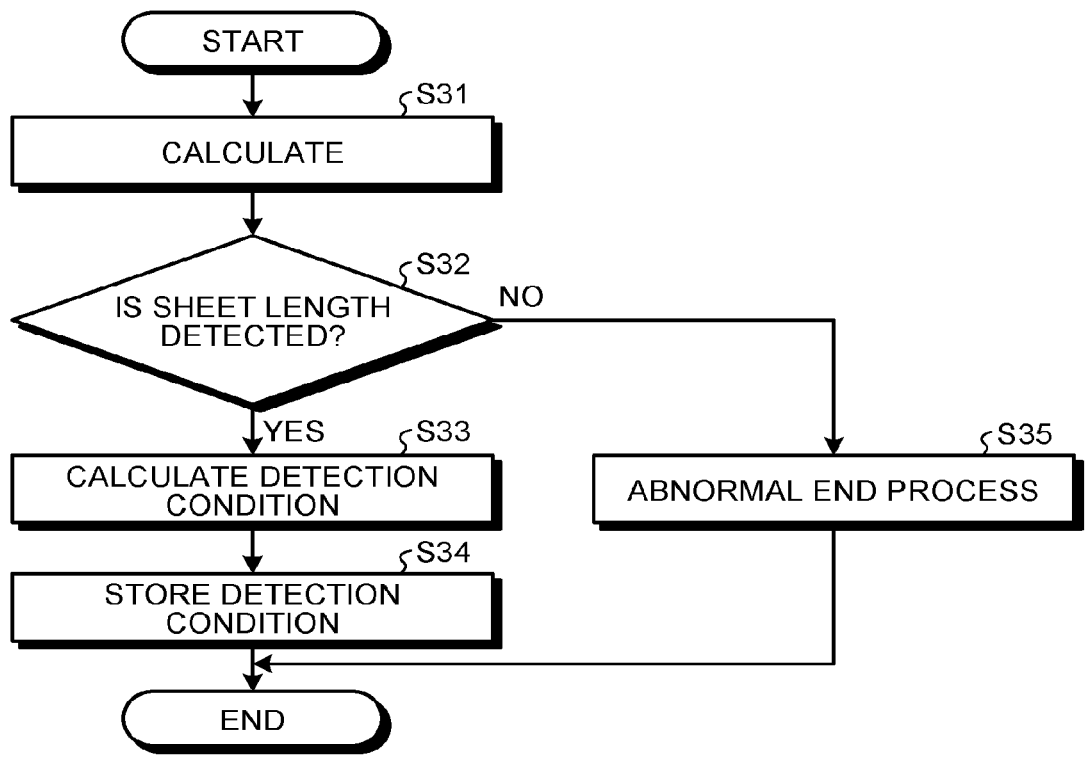
FIG. 17 is a flowchart illustrating the procedure of an adjustment operation of the monitoring time in the image forming apparatus according to the present embodiment.

FIG. 17 is a flowchart illustrating the procedure of an adjustment operation of the first monitoring time (or the second monitoring time) described above. First, the CPU 51 detects the time A, which is from the time 3 described above when the edge detection output of the first sheet running sensor 44 becomes a high level, to the time 4 described above when the edge detection output of the start trigger sensor 45 becomes a high level, for the conveyed sheet 39 (step S31). When a high-level edge detection output of the start trigger sensor 45 cannot be detected within the first monitoring time, at step S32, the CPU 51 judges that the sheet length cannot be detected (No at step S32), and proceeds the process to step S35. Then at step S35, the CPU 51 finishes the process in the flowchart of FIG. 17, by performing an abnormal end process.

On the other hand, when the high-level edge detection output of the start trigger sensor 45 is detected within the first monitoring time, at step S33, the CPU 51 calculates the maximum first monitoring time (detection condition), by integrating coefficients including variations relative to the time A described above. More specifically, when the time A described above is 1 ms, the CPU 51 calculates 2 ms, which is twice, as the maximum first monitoring time.

In this example, a period of time twice as long as the actual measurement time is calculated as the maximum first monitoring time. However, a period of time of a desired magnification such as 1.5 times or 2.3 times of the actual measurement time may be calculated as the maximum first monitoring time.

Finally, the CPU 51 stores the calculated detection conditions in the storage unit such as the RAM 53 and the HDD 54, and finishes the process in the flowchart of FIG. 17. The CPU 51 detects the next high-level edge detection output of the start trigger sensor 45, using the detection conditions stored in the storage unit. The CPU 51 also performs the same adjustment process on the second time by executing the same process.

The image forming apparatus 1 according to the present embodiment adjusts the monitoring time to an appropriate time, based on the actual measurement time as described above. Thus, it is possible to adjust the monitoring time of each image forming apparatus 1 to an appropriate time, without taking into account the assembling tolerance of the image forming apparatus 1, variations in the edge detection accuracy of the sheet 39, and the sheet conveyance speed. Hence, it is possible to perform an appropriate front-back magnification correction by measuring the length of the sheet 39 in the conveyance direction as described above.

Because the monitoring time is adjusted to an appropriate time based on the actual measurement time, it is also possible to prevent the problem of delay in the notification of the determination result to the CPU 51 that the sheet length of the sheet 39 cannot be measured. Thus, it is possible to prevent problems such as unstable operation of the image informing apparatus 1 and a system crash, which are caused when the notification of the determination result that the sheet cannot be measured is delayed and the notification to interrupt command processing in software (printing operation sequence) will not arrive in time. Furthermore, it is possible to correctly reflect the measurement results on the log processing (recording the history of processing contents, warnings, and the like) performed in software.

It is also possible to set the monitoring time adjusted based on the time A (or time B) described above, detected by conveying the sheet 39 at the slowest conveyance speed, as the common monitoring time of the first monitoring time and the second monitoring time. In this case, only the conveyance speed of one type of the sheet 39 needs to be measured, whereby the trouble of measuring the conveyance speed can be saved. It is also possible to measure the conveyance speed of the sheet 39, which may be conveyed in the image forming apparatus 1, for a plurality of times, and set the monitoring time for each measured conveyance speed. In this case, the optimal monitoring time corresponding to the conveyance speed can be used.

It is also possible to convey the sheet 39 at a certain conveyance speed, and calculate the monitoring time that matches the conveyance speed. Furthermore, it is possible to calculate the monitoring time based on the number of pulses counted by the encoder sensor 43. In this case, because the number of pulses counted by the encoder sensor 43 is not affected by the conveyance speed of the sheet 39, it is possible to calculate the correct monitoring time.

The flowchart in FIG. 17 is an example to calculate the maximum monitoring time based on the actual measurement time. However, it is also possible to calculate the minimum monitoring time based on the actual measurement time. In this case, the CPU 51 sets the minimum time, and controls the masking of the edge detection of the start trigger sensor 45. More specifically, when the time A described above is 1 ms, for example, the CPU 51 sets the minimum detection time of 0.5 ms, as the minimum detection time of the edge detection output from the start trigger sensor 45. Similarly, based on the time B described above, the CPU 51 sets the minimum detection time of the edge detection output from the stop trigger sensor 47.

Figure 18:
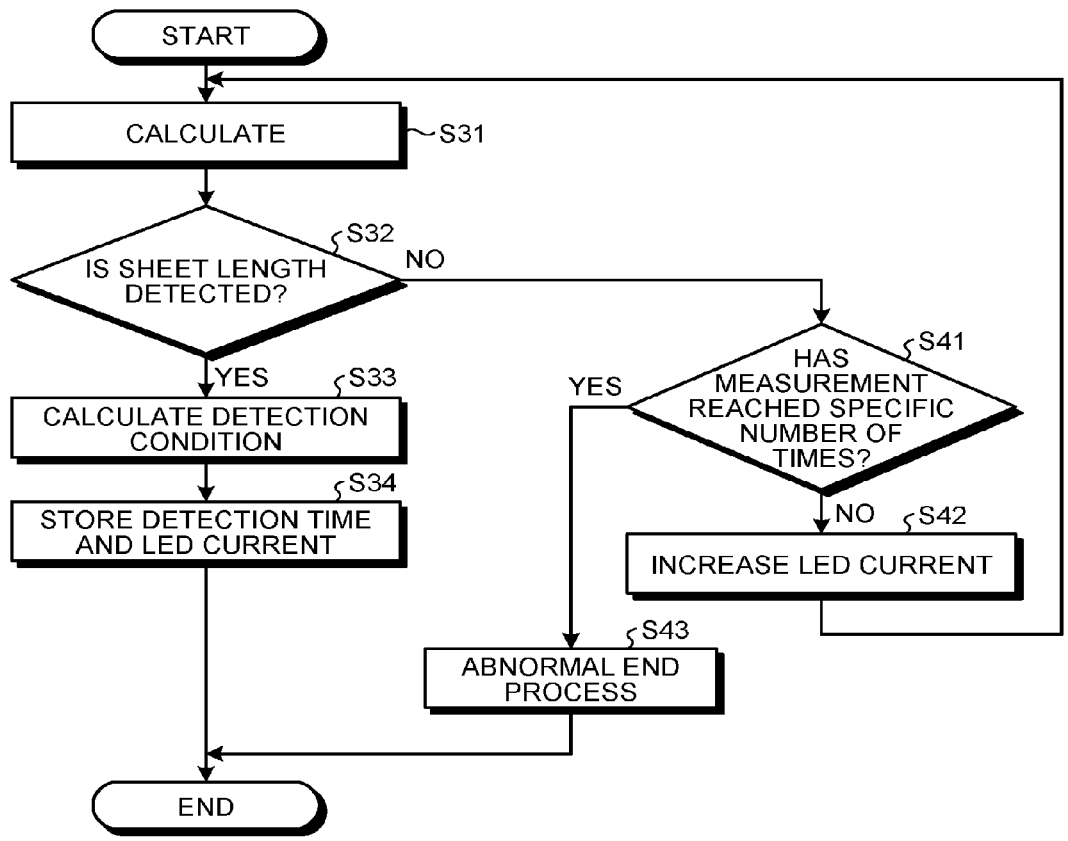
FIG. 18 is a flowchart illustrating the procedure of an operation to adjust the monitoring time while the light intensity of the LED is adjusted in the image forming apparatus according to the present embodiment.

Next, the image forming apparatus 1 according to the present embodiment can adjust the monitoring time based on the actual measurement time described above, while the light intensity of the LED 94 in the photocoupler 90 of each of the sensors 43 to 47 is adjusted. In this case, the CPU 51 includes a function of a sensitivity adjustment unit. FIG. 18 is a flowchart illustrating the procedure of an operation to adjust the monitoring time while the light intensity of the LED 94 is adjusted. In the flowchart of FIG. 18, processes from steps S31 to S33 are the same as the processes from steps S31 to S33 in the flowchart of FIG. 17. Thus, the same step numbers are denoted in FIG. 17 and FIG. 18. See the descriptions from steps S31 to S33 in FIG. 17 for detailed operations from steps S31 to S33.

In the flowchart in FIG. 18, when the stop trigger sensor 47 cannot detect a high-level edge detection output (No at step S32) during the second monitoring time from when the high-level edge detection output is detected by the second sheet running sensor 46, the process proceeds to step S41 from step S32. At step S41, the CPU 51 judges whether the number of measurement times of the high-level edge detection output by the stop trigger sensor 47 has reached a specific number of times. When it has reached the specific number of times (Yes at step S41), it means that even if the intensity of the LED 94 is adjusted, which will be described below, the stop trigger sensor 47 cannot detect the high-level edge detection output. In this case, it means that the stop trigger sensor 47 has a failure, the light intensity has lowered due to degradation, or has reached the end of life. Thus, the CPU 51, at step S43, notifies a user of abnormality by displaying an error message such as "please replace the stop trigger sensor 47" on the operation panel 67, and finishes the process in the flowchart of FIG. 18.

On the other hand, when the stop trigger sensor 47 cannot detect a high-level edge detection output, it may be because the LED 94 has insufficient light intensity. Hence, when it is judged that the number of detection times has not reached the number of specific times (No at step S41), the CPU 51 proceeds the process to step S42, and forms a current instruction signal for instructing to increase the amount of current in the LED 94 to output. As described with reference to FIG. 15, the current instruction signal is smoothed by the smoothing circuit 92, and supplied to the base of the transistor 106 via the constant current circuit 93. When the current with the amount instructed by the current instruction signal flows in the transistor 106, the current of the amount instructed by the current instruction signal flows in the LED 94. The light intensity of the LED 94 becomes the increased light intensity corresponding to the current instruction signal.

Next, the CPU 51 returns the process to step S31, in a state that the light intensity of the LED 94 is increased as above, and detects a high-level edge detection output by the stop trigger sensor 47 again. When the sheet length of the sheet 39 cannot be detected because the edge detection output cannot be detected, in the processes at steps S41 and S42, the CPU 51 increases the light intensity of the LED 94 again and detects an edge detection output. At step S41, the CPU 51 repeats the detection of edge detection output while gradually increasing the light intensity of the LED 94 as described above, until the number of times the edge detection output is detected has reached the specific number of times.

Next, when the edge detection output is detected, at step S33, the CPU 51 sets the monitoring time as described above, and proceeds the process to step S44. The CPU 51, at step S44, stores the information on the amount of current indicating the amount of current in the LED 94, with the monitoring time information indicating the monitoring time being set, in the storage unit such as the RAM 53 and the HDD 54, and finishes the process in the flowchart of FIG. 18. The CPU 51 drives and controls the LED 94 based on the information on the amount of current stored in the storage unit, and detects a high-level edge detection output by the stop trigger sensor 47 within the monitoring time indicated by the monitoring time information. In this manner, it is possible to control the LED 94 to an optimal light intensity, and detect the edge detection output within the monitoring time. As a result, it is possible to perform an appropriate front-back magnification correction.

The CPU 51 performs the same process as above, to detect the edge detection output corresponding to the first sheet running sensor 44 and the start trigger sensor 47. Also, depending on the type of sheet, the thickness of sheet, the color of sheet, or the like, the reflection light and the conveyance behavior of the LED 94 differ. Hence, by storing the information on the amount of current corresponding to the type of sheet, the thickness of sheet, the color of sheet, or the like of the sheet 39 in the storage unit described above, it is possible to adjust the amount of current in the LED 94 for each type of the sheet, each thickness of the sheet, or each color of the sheet. As a result, it is possible to increase the type of the sheet 39 that can be detected.

As is evident from the above description, in the image forming apparatus 1 according to the present embodiment, the start trigger sensor 45, which is a transmission or reflection-type optical sensor that triggers to start measuring the sheet length, is provided in the vicinity of the upstream side of the driven roller 40 and the driving roller 49. The stop trigger sensor 47, which is a transmission or reflection-type optical sensor that triggers to finish measuring the sheet length, is provided in the vicinity of the downstream side of the driven roller 40 and the driving roller 49. The first sheet running sensor 44 that detects a paper jam and the like is arranged beside the start trigger sensor 45 along the scanning direction, in a side-by-side manner. Also, the second sheet running sensor 46 that detects a paper jam and the like is arranged beside the stop trigger sensor 47 along the scanning direction, in a side-by-side manner.

Although the highly accurate reflection-type optical sensor is used for the start trigger sensor 45 and the stop trigger sensor 47, the non-directional reflection-type optical sensor is used for the first sheet running sensor 44 and the second sheet running sensor 46. Because the non-directional reflection-type optical sensor is used for the first sheet running sensor 44 and the second sheet running sensor 46, the edge detection accuracy of the sheet 39 is not very high. However, regardless of the paper type of the sheet 39, the first sheet running sensor 44 and the second sheet running sensor 46 can accurately detect whether the sheet 39 has passed in front of the first sheet running sensor 44 and the second sheet running sensor 46.

In the image forming apparatus 1 according to the present embodiment, it is judged whether the leading edge 39*a* and the trailing edge 39*b* of the sheet 39 being conveyed are detected, by comprehensively using each of the outputs of the start trigger sensor 45, the stop trigger sensor 47, the first sheet running sensor 44, and the second sheet running sensor 46. In this manner, for example, even if a special sheet, the leading edge 39*a* and the trailing edge 39*b* of which are difficult to detect, such as an OHP sheet and a black paper, is conveyed, it is possible to automatically identify it. It is also possible to urge a user to input the front-back magnification correction value. It is further possible to have a user select whether to perform the front-back magnification correction. Thus, it is possible to perform more accurate front-back magnification correction relative to a wide variety of sheets and obtain good printing results.

When the leading edge 39*a* and the trailing edge 39*b* cannot be detected, the user is notified that the front-back magnification correction cannot be applied to the sheet 39. The user is then urged to input a front-back magnification correction value. When the user inputs the front-back magnification correction value, the input front-back magnification correction value is used to perform the front-back magnification correction. Thus, it is possible to perform the front-back magnification correction on a special sheet, to which the front-back magnification correction is difficult to apply, because the leading edge 39*a* and the trailing edge 39*b* of which are difficult to detect, such as an OHP sheet and a black paper.

When the leading edge 39*a* cannot be detected for equal to or more than a predetermined number of times, it is identified that a failure has occurred on the start trigger sensor 45, and the user is notified via the operation panel 67. Similarly, when the trailing edge 39*b* cannot be detected for equal to or more than a predetermined number of times, it is identified that a failure has occurred on the stop trigger sensor 47, and the user is notified via the operation panel 67. Hence, it is possible to notify the user that a failure has occurred on the start trigger sensor 45 and the stop trigger sensor 47.

Also, the sheet 39, the leading edge 39*a* and the trailing edge 39*b* of which cannot be detected, is controlled and ejected to a paper ejection tray different from the paper ejection tray usually used for ejecting sheets. Alternatively, the sheet, the leading edge 39*a* and the trailing edge 39*b* of which cannot be detected, is controlled and ejected by being shifted. Hence, it is possible to separately eject the sheet to which the front-back magnification correction is difficult to apply, and the sheet to which the front-back magnification correction can be applied. As a result, the user can easily identify the sheet to which the front-back magnification correction is difficult to apply.

Because the monitoring time is adjusted to an appropriate time based on the actual measurement time, it is possible to adjust the monitoring time of each image forming apparatus 1 to an appropriate time, without taking into account the assembling tolerance of the image forming apparatus 1, variations in the edge detection accuracy of the sheet 39, and the sheet conveyance speed. Consequently, it is possible to perform an appropriate front-back magnification correction by measuring the length of the sheet 39 in the conveyance direction described above.

By adjusting the monitoring time to an appropriate time based on the actual measurement time, it is possible to prevent the problem of delay in the determination result to the CPU 51 that the sheet length of the sheet 39 cannot be measured. Thus, it is possible to prevent problems such as unstable operation of the image informing apparatus 1 and a system crash, which are caused when the notification of the determination result that the sheet cannot be measured is delayed, and the notification to interrupt command processing in software (printing operation sequence) will not arrive in time. Furthermore, it is possible to correctly reflect the measurement results on the log processing (recording the history of processing contents, warnings, and the like) performed in software.

It is also possible to control the LED 94 to an optimal light intensity, and detect the edge detection output within the monitoring time. Consequently, it is possible to perform an appropriate front-back magnification correction.

By storing the information on the amount of current corresponding to the type of sheet, the thickness of sheet, the color of sheet, or the like of the sheet 39 in the storage unit, it is possible to adjust the amount of current in the LED 94 for each type of the sheet, each thickness of the sheet, or each color of the sheet. As a result, it is possible to increase the type of the sheet 39 that can be detected.

An embodiment provides the advantageous effect that more accurate front-back magnification correction relative to a wide variety of sheets can be performed and good printing results can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an edge detection sensor that detects one edge, in a conveyance direction, of a sheet conveyed by a conveyance mechanism;
   a passing detection sensor that is different from the edge detection sensor and that detects passing of the one edge of the conveyed sheet; and
   circuitry that
      judges whether the edge detection sensor or the passing detection sensor has detected the one edge, within a predetermined monitoring time after the edge detection sensor or the passing detection sensor detected the one edge,
      generates a notification indicating that front-back magnification correction is difficult to perform on the sheet when the circuitry has judged that the one edge is not detected within the monitoring time,
      acquires a desirable front-back magnification correction value input via an operation panel according to the notification, and
      performs a front-back magnification correction process on the sheet, using the acquired front-back magnification correction value, wherein
   the edge detection sensor includes a first edge detection sensor that detects a leading edge of the conveyed sheet and a second edge detection sensor that detects a trailing edge of the conveyed sheet,
   the passing detection sensor includes a first passing detection sensor that detects passing of the leading edge of the conveyed sheet and a second passing detection sensor that detects passing of the trailing edge of the conveyed sheet, and
   the circuitry generates the notification indicating that front-back magnification correction is difficult to perform on the sheet when the first edge detection sensor does not detect the leading edge within the monitoring time after the first passing detection sensor detected the leading edge or when the second edge detection sensor does not detect the trailing edge within the monitoring time after the second passing detection sensor detected the trailing edge.

2. The image forming apparatus according to claim 1, wherein the circuitry
   calculates a sheet length of the sheet, using detection output of the leading edge of the sheet by the first edge detection sensor and detection output of the trailing edge of the sheet by the second edge detection sensor,
   calculates a front-back magnification correction value of the sheet, using the sheet length calculated by the circuitry, and
   performs the front-back magnification correction process on the sheet, using the front-back magnification correction value calculated by the circuitry or the front-back magnification correction value input via the operation panel.

3. The image forming apparatus according to claim 1, wherein
   the edge detection sensor is a highly directional reflection-type optical sensor that detects an edge of the sheet based on an amount of reflection light reflected on the sheet by irradiating the sheet with light from a light source, and
   the passing detection sensor is a non-directional reflection-type optical sensor that detects passing of the sheet based on an amount of reflection light reflected on the sheet by irradiating the sheet with light from a light source.

4. The image forming apparatus according to claim 2, wherein the circuitry ejects a sheet the sheet length of which has failed to be calculated by the circuitry as the first edge detection sensor does not provide detection output of the leading edge of the sheet or the second edge detection sensor does not provide detection output of the trailing edge of the sheet, separately from a sheet the sheet length of which has been calculated.

5. The image forming apparatus according to claim 1, wherein the circuitry
   detects failure of the edge detection sensor when number of times the edge detection sensor fails to detect the one edge within the monitoring time reaches a predetermined number of times or more, and
   generates a notification indicating the failure.

6. The image forming apparatus according to claim 1, wherein the circuitry changes a length of the monitoring time, according to an actual measurement time from when the edge detection sensor or the passing detection sensor detects the one edge until when the edge detection sensor or the passing detection sensor detects the one edge.

7. The image forming apparatus according to claim 6, wherein the circuitry changes the length of the monitoring time to a longer monitoring time than an original monitoring time.

8. The image forming apparatus according to claim 6, wherein the circuitry changes the length of the monitoring time to a shorter monitoring time than an original monitoring time.

9. The image forming apparatus according to claim 6, wherein the circuitry changes the monitoring time according to a type, a thickness, or a color of the sheet.

10. The image forming apparatus according to claim 1, wherein the circuitry adjusts a detection sensitivity of the edge detection sensor.

11. The image forming apparatus according to claim 10, wherein the circuitry gradually adjusts the detection sensitivity to a higher sensitivity, each time the edge detection sensor fails to detect the one edge.

12. The image forming apparatus according to claim 1, wherein the circuitry uses a predetermined monitoring conveyance amount of the sheet as the monitoring time, and changes a length of the monitoring conveyance amount, according to a conveyance amount of the sheet from when the edge detection sensor or the passing detection sensor detects the one edge until when the edge detection sensor or the passing detection sensor detects the one edge.

13. A front-back magnification correction method comprising:
   by an edge detection sensor, detecting one edge, in a conveyance direction, of a sheet conveyed by a conveyance mechanism;
   by a passing detection sensor that is different from the edge detection sensor, detecting passing of the edge of the conveyed sheet;

by circuitry, judging whether the edge detection sensor or the passing detection sensor has detected the one edge, within a predetermined monitoring time after the edge detection sensor or the passing detection sensor detected the one edge;
by the circuitry, generating a notification indicating that front-back magnification correction is difficult to perform on the sheet when the judging has judged that the one edge is not detected within the monitoring time;
by the circuitry, acquiring a desirable front-back magnification correction value input via an operation panel according to the notification; and
by the circuitry, performing a front back magnification correction process on the sheet, using the front-back magnification correction value input via the operation panel, the edge detection sensor including a first edge detection sensor that detects a leading edge of the conveyed sheet and a second edge detection sensor that detects a trailing edge of the conveyed sheet, the passing detection sensor including a first passing detection sensor that detects passing of the leading edge of the conveyed sheet and a second passing detection sensor that detects passing of the trailing edge of the conveyed sheet, wherein
the generating generates the notification indicating that front-back magnification correction is difficult to perform on the sheet when the first edge detection sensor does not detect the leading edge within the monitoring time after the first passing detection sensor detected the leading edge or when the second edge detection sensor does not detect the trailing edge within the monitoring time after the second passing detection sensor detected the trailing edge.

14. A computer program product comprising a non-transitory computer-readable medium containing an information processing program, the program, when executed by a computer, causes the computer to perform a method, the method comprising:
controlling an edge detection sensor to detect one edge, in a conveyance direction, of a sheet conveyed by a conveyance mechanism;
controlling a passing detection sensor that is different from the edge detection sensor to detect passing of the one edge of the conveyed sheet;
judging whether the edge detection sensor or the passing detection sensor has detected the one edge, within a predetermined monitoring time after the edge detection sensor or the passing detection sensor detected the one edge;
generating a notification indicating that front-back magnification correction is difficult to perform on the sheet when the judging has judged that the one edge is not detected within the monitoring time;
acquiring a desirable front-back magnification correction value input via an operation panel according to the notification; and
performing a front-back magnification correction process on the sheet, using the acquired front-back magnification correction value, the edge detection sensor including a first edge detection sensor that detects a leading edge of the conveyed sheet and a second edge detection sensor that detects a trailing edge of the conveyed sheet, the passing detection sensor including a first passing detection sensor that detects passing of the leading edge of the conveyed sheet and a second passing detection sensor that detects passing of the trailing edge of the conveyed sheet, wherein
the generating generates the notification indicating that front-back magnification correction is difficult to perform on the sheet when the first edge detection sensor does not detect the leading edge within the monitoring time after the first passing detection sensor detected the leading edge or when the second edge detection sensor does not detect the trailing edge within the monitoring time after the second passing detection sensor detected the trailing edge.

15. An image forming apparatus comprising:
an edge detection sensor that detects one edge, in a conveyance direction, of a sheet conveyed by a conveyance mechanism;
a passing detection sensor that is different from the edge detection sensor and that detects passing of the one edge of the conveyed sheet, the edge detection sensor and the passing detection sensor being aligned in a direction perpendicular to the conveyance direction of the sheet; and
circuitry that
judges whether one of the edge detection sensor and the passing detection sensor has detected the one edge, within a predetermined monitoring time after the other of the edge detection sensor and the passing detection sensor detected the one edge,
generates a notification indicating that front-back magnification correction is difficult to perform on the sheet when the circuitry has judged that the one edge is not detected within the monitoring time,
acquires a desirable front-back magnification correction value input via an operation panel according to the notification, and
performs a front-back magnification correction process on the sheet, using the acquired front-back magnification correction value.

16. The image forming apparatus according to claim 15, wherein
the edge detection sensor is a highly directional reflection-type optical sensor that detects an edge of the sheet based on an amount of reflection light reflected on the sheet by irradiating the sheet with light from a light source, and
the passing detection sensor is a non-directional reflection-type optical sensor that detects passing of the sheet based on an amount of reflection light reflected on the sheet by irradiating the sheet with light from a light source.

17. A front-back magnification correction method comprising:
by an edge detection sensor, detecting one edge, in a conveyance direction, of a sheet conveyed by a conveyance mechanism;
by a passing detection sensor that is different from the edge detection sensor, detecting passing of the edge of the conveyed sheet, the edge detection sensor and the passing detection sensor being aligned in a direction perpendicular to the conveyance direction of the sheet;
by circuitry, judging whether one of the edge detection sensor and the passing detection sensor has detected the one edge, within a predetermined monitoring time after the other of the edge detection sensor and the passing detection sensor detected the one edge;
by the circuitry, generating a notification indicating that front-back magnification correction is difficult to perform on the sheet when the judging has judged that the one edge is not detected within the monitoring time;

by the circuitry, acquiring a desirable front-back magnification correction value input via an operation panel according to the notification; and by the circuitry, performing a front-back magnification correction process on the sheet, using the front-back magnification correction value input via the operation panel.

18. A computer program product comprising a non-transitory computer-readable medium containing an information processing program, the program, when executed by a computer, causes the computer to perform a method, the method comprising:

controlling an edge detection sensor to detect one edge, in a conveyance direction, of a sheet conveyed by a conveyance mechanism;

controlling a passing detection sensor that is different from the edge detection sensor to detect passing of the one edge of the conveyed sheet, the edge detection sensor and the passing detection sensor being aligned in a direction perpendicular to the conveyance direction of the sheet;

judging whether one of the edge detection sensor and the passing detection sensor has detected the one edge, within a predetermined monitoring time after the other of the edge detection sensor and the passing detection sensor detected the one edge;

generating a notification indicating that front-back magnification correction is difficult to perform on the sheet when the judging has judged that the one edge is not detected within the monitoring time;

acquiring a desirable front-back magnification correction value input via an operation panel according to the notification; and performing a front-back magnification correction process on the sheet, using the acquired front-back magnification correction value.

* * * * *